(12) United States Patent
Mutoh

(10) Patent No.: US 10,151,597 B2
(45) Date of Patent: *Dec. 11, 2018

(54) ROUTE SEARCH APPARATUS AND ROUTE SEARCH METHOD

(71) Applicant: SONY CORPORATION, Tokyo (JP)

(72) Inventor: Yasuo Mutoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 139 days.

This patent is subject to a terminal disclaimer.

(21) Appl. No.: 14/820,979

(22) Filed: Aug. 7, 2015

(65) Prior Publication Data

US 2015/0345979 A1 Dec. 3, 2015

Related U.S. Application Data

(63) Continuation of application No. 13/489,707, filed on Jun. 6, 2012, now Pat. No. 9,151,635.

(30) Foreign Application Priority Data

Jun. 20, 2011 (JP) ................................. 2011-136510

(51) Int. Cl.
| | |
|---|---|
| *G01C 21/36* | (2006.01) |
| *G01S 19/13* | (2010.01) |
| *G01C 21/34* | (2006.01) |
| *G01C 22/00* | (2006.01) |

(52) U.S. Cl.
CPC ....... *G01C 21/3605* (2013.01); *G01C 21/343* (2013.01); *G01C 21/3617* (2013.01); *G01S 19/13* (2013.01); *G01C 21/3608* (2013.01); *G01C 21/3664* (2013.01); *G01C 22/002* (2013.01); *G01C 22/006* (2013.01)

(58) Field of Classification Search
CPC .............. G01C 21/3423; G01C 21/343; G01C 21/3605; G01C 21/3608; G01C 21/3617; G01C 21/3664; G01C 22/002; G01C 22/006; G01S 19/13
See application file for complete search history.

(56) References Cited

U.S. PATENT DOCUMENTS

| | | | |
|---|---|---|---|
| 8,489,321 B2* | 7/2013 | Lee ........................ | G01C 21/20 701/302 |
| 2006/0206258 A1* | 9/2006 | Brooks .................. | G01C 21/34 701/439 |
| 2012/0310530 A1* | 12/2012 | Lee .................... | G01C 21/3697 701/439 |

OTHER PUBLICATIONS

Notification of the First Office Action (Chinese application No. 201210194066.X), The State Intellectual Property Office of the People's Republic of China, dated Jan. 22, 2016.

* cited by examiner

*Primary Examiner* — Jerrah Edwards

(74) *Attorney, Agent, or Firm* — Chip Law Group

(57) ABSTRACT

There is provided a route search apparatus including a measuring unit configured to measure a traveling distance or a traveling time, a position information acquiring unit configured to acquire position information of a current point, a start point registering unit configured to register the position information, which is acquired by the position information acquiring unit when the measuring unit starts the measurement, as position information of a start point, and a route searching unit configured to, if an operation of returning to the start point is detected, search a return route between the current point designated as a departure point when the operation of returning to the start point is detected and the start point designated as a destination.

20 Claims, 24 Drawing Sheets

FIG.18

| POINT | POINT NAME |
|---|---|
| START POINT | CHECK POINT 1 |
| VIA POINT 1 | CHECK POINT 2 |
| VIA POINT 2 | RAMEN STORE B |
| VIA POINT 3 | CHECK POINT 3 |
| VIA POINT 4 | CYCLE SHOP E |
| ... | ... |
| | |
| VIA POINT n | AROUND XX |

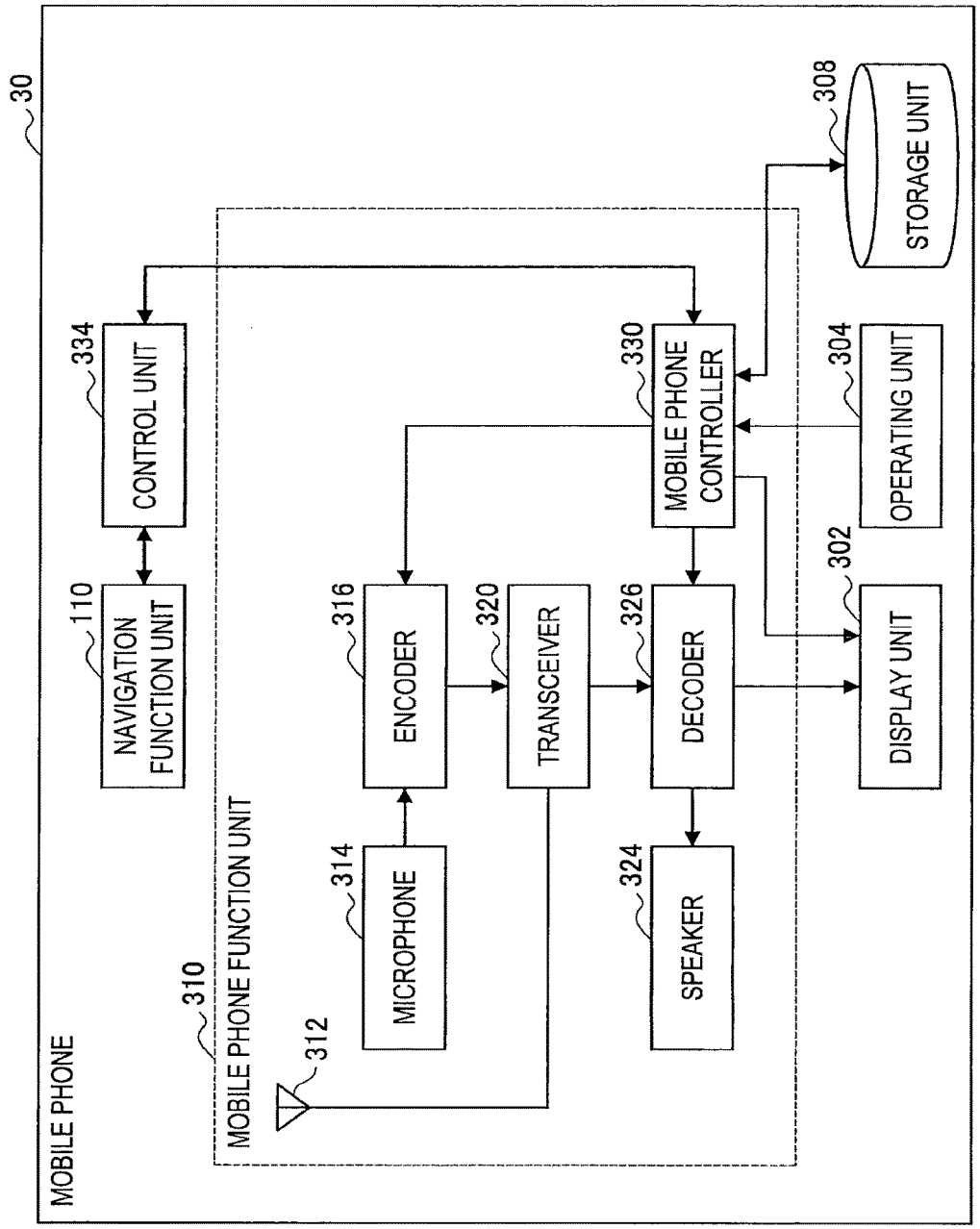

ROUTE SEARCH APPARATUS AND ROUTE SEARCH METHOD

CROSS-REFERENCE TO RELATED APPLICATION

The present application is a continuation of U.S. patent application Ser. No. 13/489,707 filed on Jun. 6, 2012 which claims priority of Japanese Patent Appl. No. 2011-136510 filed on Jun. 20, 2011 in the Japanese Patent Office, all of which are incorporated herein by reference.

BACKGROUND

The present disclosure relates to a route search apparatus, a route search method, and a program.

Navigation devices that advise users of routes from a current place to a selected place have been widely provided. In addition to stationary navigation devices installed in vehicles, portable navigation devices which users may carry are recently beginning to emerge. On the other hand, a portable electronic device, including a mobile phone, has been configured to include a navigation function.

The portable navigation device may be installed in a cycle. In general, a cycle computer has been installed so far in a cycle and used to measure a cycling distance or cycling time (e.g., Patent document 1). However, with the advent of the navigation device which may be installed in the cycle, a navigation device equipped with a cycle computer function has been provided.

PRIOR ART

Patent Document

[Patent document 1] Patent Application Publication No. 2003-246288

SUMMARY

The measurement function and the navigation function are individually installed. However, a combination of the two functions has not been under consideration. In case of cycling, a user may have to return to his/her starting point. In this situation, in order for the user to search for a route to the starting point using the navigation function, the user may have to recollect the starting point and set the starting point as a destination. If the starting point has been already registered, it may be possible to easily set a destination by selecting the starting point from among registered points. In this case, the user has to perform a point registration operation and a measurement start operation for the starting point. In either situation, the user has to perform cumbersome operations.

The present disclosure provides a new, improved route search apparatus, route search method, and program, enabling a user to easily search for a return route to return to a start point where measurement is started.

According to an embodiment of the present disclosure, there is provided a route search apparatus which includes a measuring unit configured to measure a traveling distance or a traveling time; a position information acquiring unit configured to acquire position information of a current point; a start point registering unit configured to register the position information, which is acquired by the position information acquiring unit when the measuring unit starts the measurement, as position information of a start point; and a route searching unit configured to, if an operation of returning to the start point is detected, search a return route between a current point designated as a departure point when the operation of returning to the start point is detected and the start point designated as a destination.

According to another embodiment of the present disclosure, there is provided a route search method which includes measuring a traveling distance or a traveling time; acquiring position information of a current point repeatedly; registering the position information, which is acquired when the measurement of the traveling distance or the traveling time is started, as position information of a start point; and searching a return route between a current point designated as a departure point when the operation of returning to the start point is detected and the start point designated as a destination.

According to another embodiment of the present disclosure, there is provided a program configured to implement a route search method including measuring a traveling distance or a traveling time; acquiring position information of a current point repeatedly; registering the position information, which is acquired when the measurement of the traveling distance or the traveling time is started, as position information of a start point; and searching a return route between a current point designated as a departure point when the operation of returning to the start point is detected and the start point designated as a destination.

EFFECTS OF THE INVENTION

As described above, the present disclosure provides a technology for easily searching for a return route to a start point where measurement is started.

BRIEF DESCRIPTION OF THE DRAWINGS

FIG. 18 is a view illustrating a list of registered points of a PND according to the second embodiment of the present disclosure;

FIG. 27 is a block diagram illustrating the function and structure of a mobile phone according to the fourth embodiment of the present disclosure.

DETAILED DESCRIPTION OF THE EMBODIMENT(S)

Figure 1:
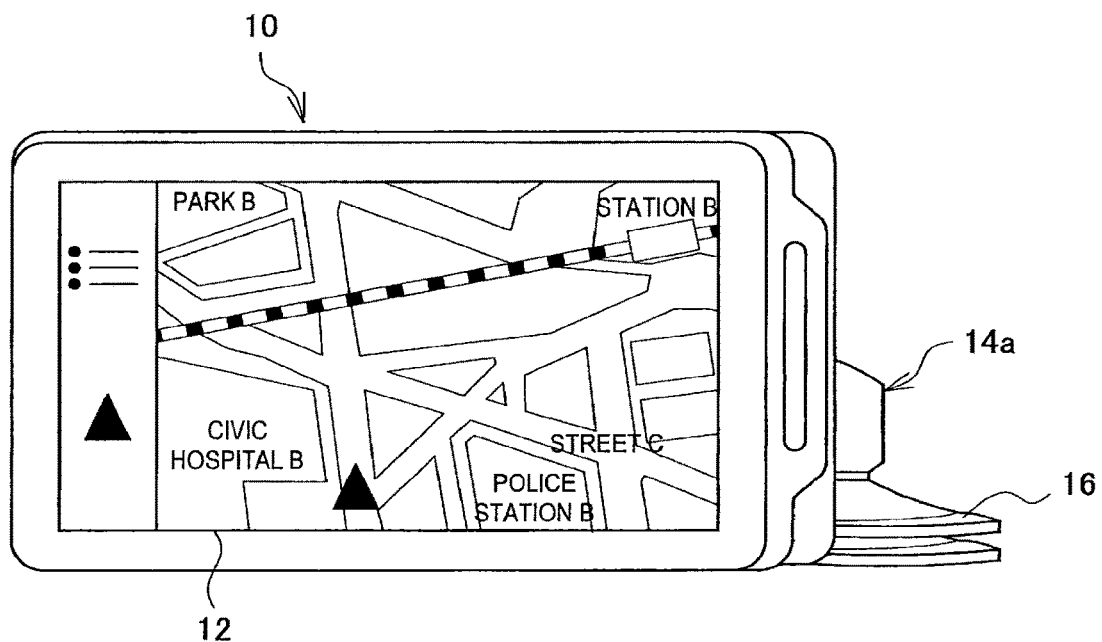
FIG. 1 is a view illustrating an external appearance of a personal navigation device (PND) according to first to third embodiments of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The preferred embodiments of the present disclosure will be described in the following order.

1. First embodiment (Registration of a point where measurement is started)
   1-1. Overview
   1-2. Function and structure
   1-3. Example of operation
   1-4. Example of effect 2. Second embodiment (Registration of a via point)
   2-1. Function and structure
   2-2. Example of operation
   2-3. Example of effect 3. Third embodiment (Estimation of a start point)
   3-1. Function and structure
   3-2. Example of operation
   3-3. Example of effect 4. Fourth embodiment (Application to a mobile phone)

1. First Embodiment (1-1. Overview)

Figure 2:
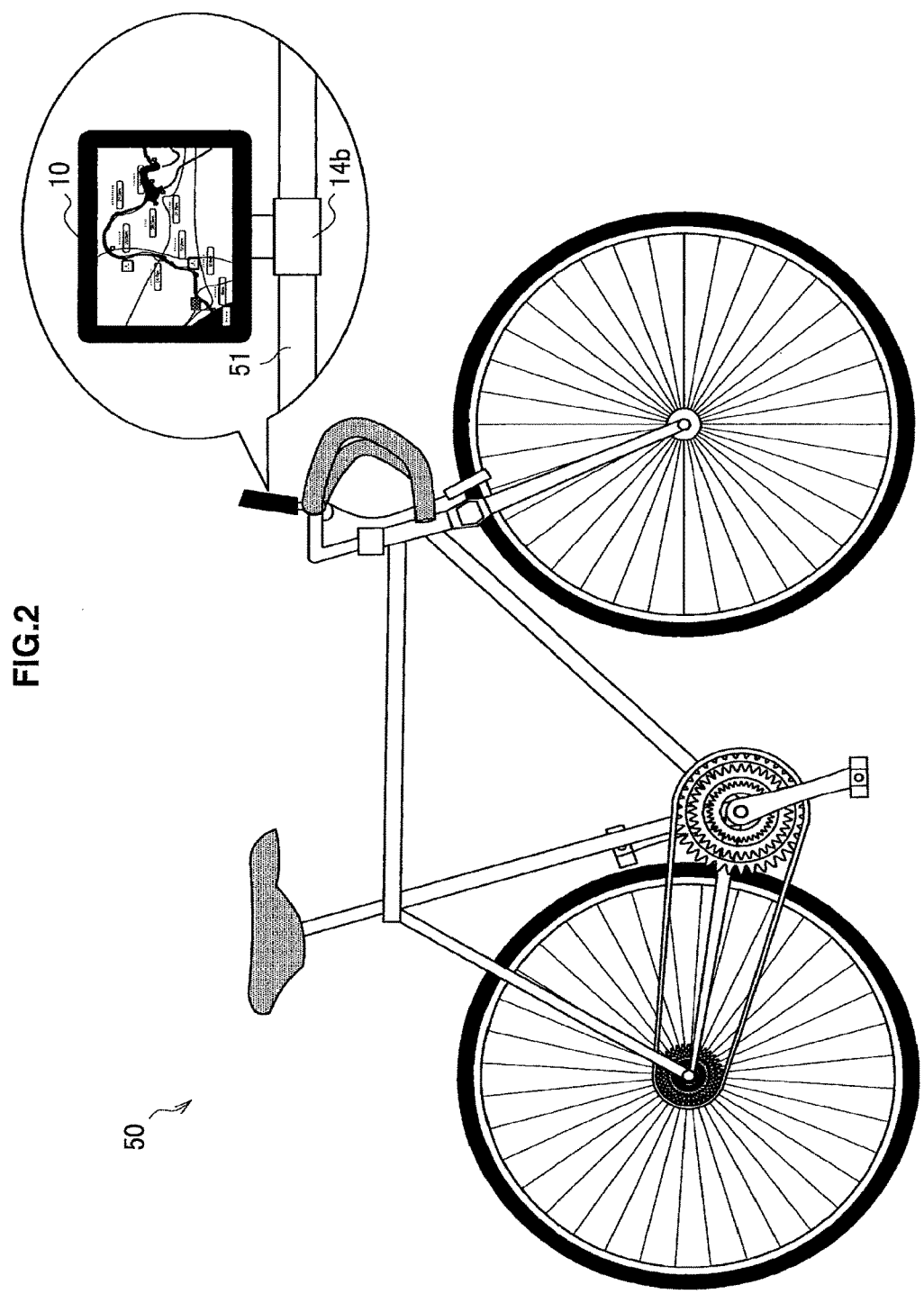
FIG. 2 is a view illustrating a PND installed in a cycle according to the first to third embodiments of the present disclosure.

A personal navigation device (PND) as an example of a navigation device according to first to third embodiments of the present disclosure will be generally described with reference to FIGS. 1 and 2. FIG. 1 is a view illustrating an external appearance of a PND according to the first to third embodiments of the present disclosure. FIG. 2 is a view illustrating a PND installed in a cycle according to the first to third embodiments of the present disclosure.

The PND 10 according to the first to third embodiments of the present disclosure includes a different structure of a control unit 150. In this case, the control unit 150 according to the first embodiment will be referred to as a control unit 150a. Accordingly, when a function specific to the first embodiment is described, the PND 10 according to the first embodiment will be referred to as the PND 10a. Likewise, the PND 10 and the control unit 150 according to the second embodiment will be referred to as a PND 10b and a control unit 150b, respectively; and the PND 10 and the control unit 150 according to the third embodiment will be referred to as a PND 10c and a control unit 150c, respectively. However, if a plurality of elements each having substantially the same function and structure does not have to be distinguished from each other, the elements are denoted by the same reference numeral. For example, if the PND 10a, the PND 10b, and the PND 10c do not have to be distinguished from each other, the PND 10a, the PND 10b, and the PND 10c will be referred to as the PND 10. Likewise, if the control unit 150a, the control unit 150b, and the control unit 150c do not have to be distinguished from each other, the control unit 150a, the control unit 150b, and the control unit 150c will be referred to as the control unit 150.

FIG. 1 illustrates an external appearance of the PND 10 as an example of a navigation device according to the first to third embodiments of the present disclosure. The PND 10 is equipped with a navigation function of advising a user of a route to a destination and a function of providing the user with a variety of information related to position information. The PND 10 includes a display unit 12 on its front side to display an image including an information providing screen for providing a variety of information. The PND 10 is supported by a cradle 14a for a vehicle, which is attached to a dashboard of the vehicle by means of a sucking disk 16. The PND 10 may be easily installed in the cradle 14a and also easily removed from the cradle 14a. Accordingly, the PND 10 may be used in a plurality of vehicles. The PND 10 has a function of acquiring information on a current position of the PND 10 and stores map data at the same time. Accordingly, the PND 10 may display the current position information, which is overlapped on the map, on the display unit 12.

The PND 10 has a plurality of operation modes, such as vehicle mode, walking mode, and cycling mode. The PND 10 may search for an appropriate route according to the operation mode. For example, the PND 10 operating in a vehicle mode may search for a route including a highway. Further, the PND 10 operating in a vehicle mode may predict congested areas and search for a route excluding the predicted congested areas. The PND 10 operating in a walking mode may search for a route for walking, such as an underground passage, a station concourse, a bridge sidewalk and a park, using map data for walking other than the map data for the vehicle. Further, the PND 10 operating in a cycling mode may set a route which is suitable for a cycle. For example, the PND 10 operating in a cycling mode may search for a route suitable for a cycle by searching for a route including a narrow route which is difficult for a vehicle to pass through.

The present disclosure describes a technology especially suitable for a navigation device which is installed in a cycle. The PND 10 operating in a cycling mode will be described with reference to FIG. 2. As shown in FIG. 2, the PND 10 may be fixed to the cycle 50 using a cradle 14*b* for a cycle. The PND 10 may be fixed to a handle 51 of the cycle 50 by means of a cradle 14*b*.

(1-2. Function and Structure)

Figure 3:
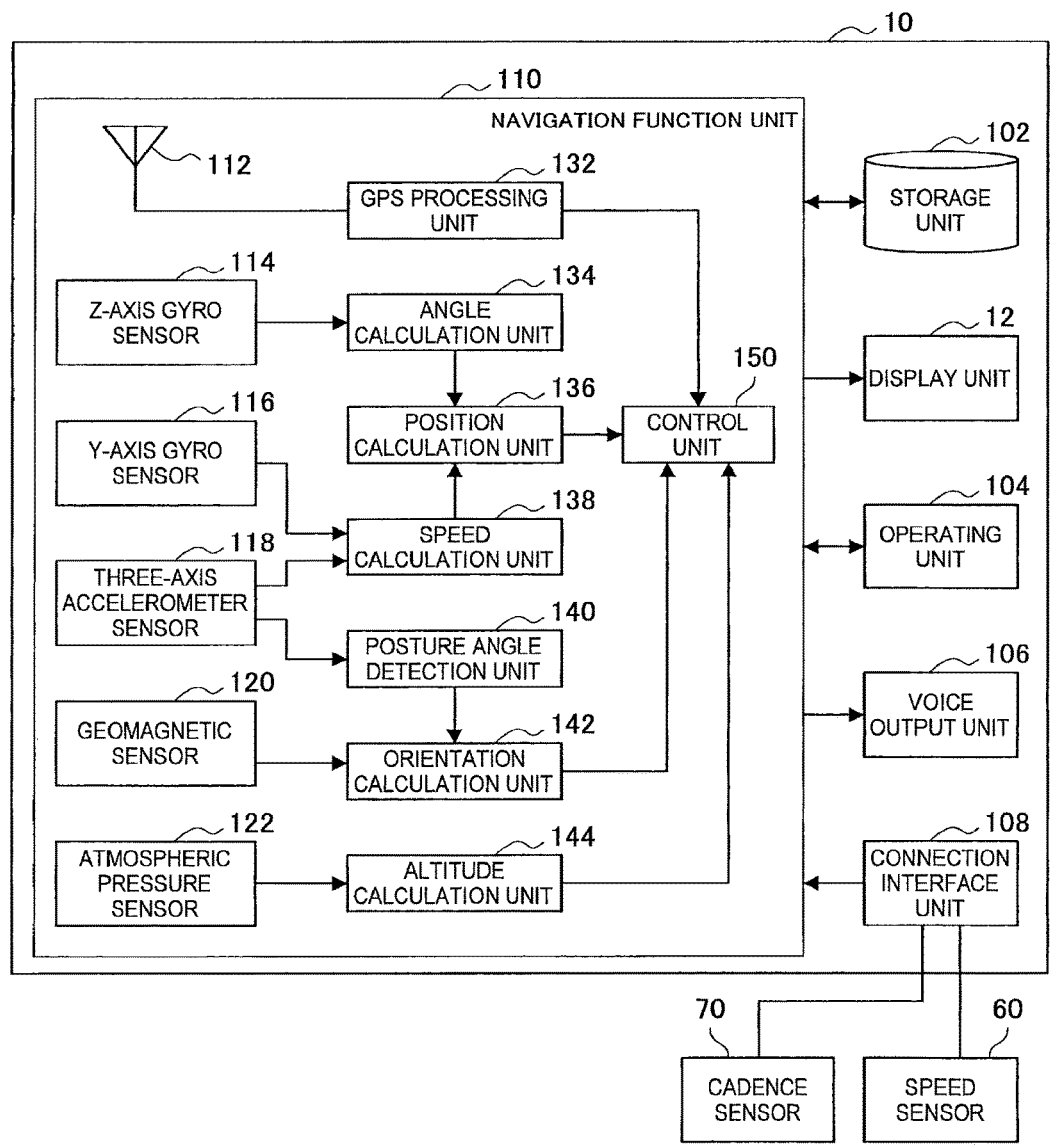
FIG. 3 is a block diagram illustrating the function and structure of a PND according to the first to third embodiments of the present disclosure.
Figure 4:
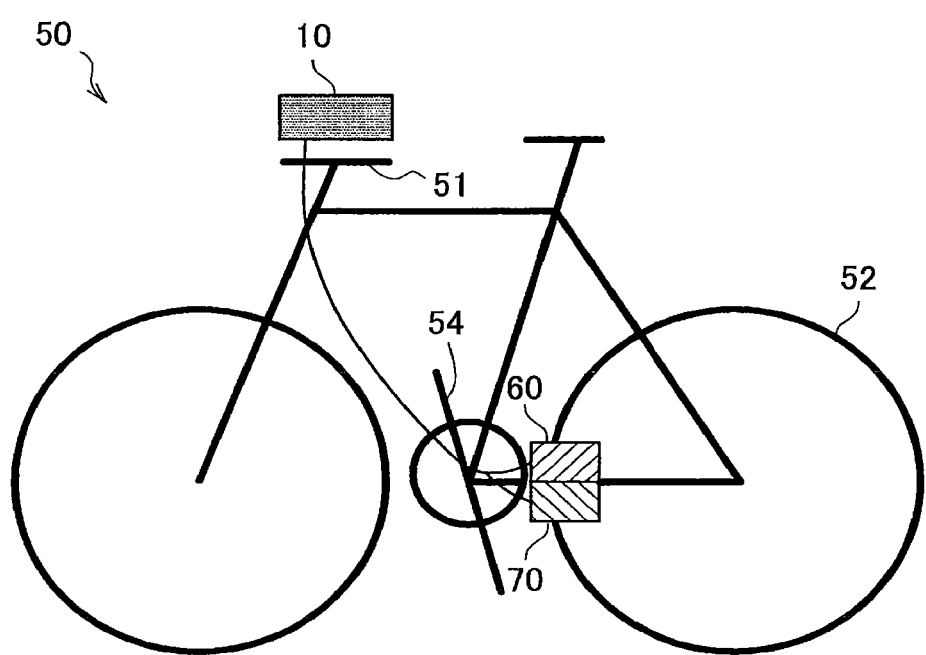
FIG. 4 is a view illustrating installation of a PND and sensors according to the first to third embodiments of the present disclosure.
Figure 5:
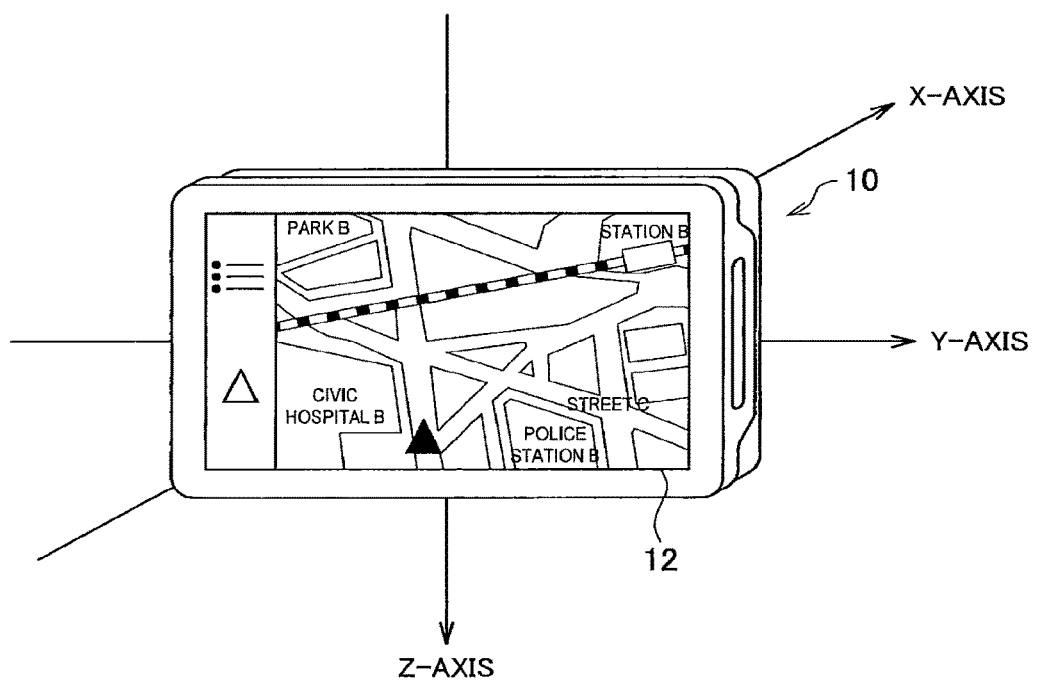
FIG. 5 is a block diagram illustrating a coordinate system of a PND according to the first to third embodiments of the present disclosure.
Figure 6:
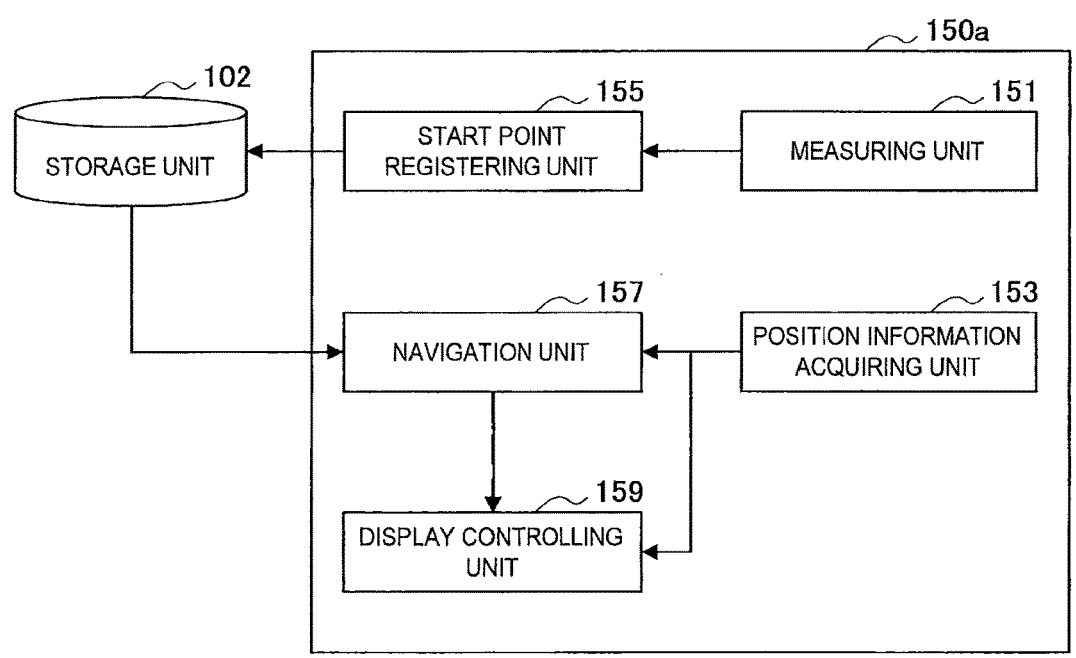
FIG. 6 is a block diagram illustrating the function and structure of a control unit of a PND according to the first embodiment of the present disclosure.

The function and structure of the PND 10 according to the first to third embodiments of the present disclosure will be described with reference to FIGS. 3 to 6. FIG. 3 is a block diagram illustrating the function and structure of a PND according to the first to third embodiments of the present disclosure. FIG. 4 is a view illustrating installation of a PND and sensors according to the first to third embodiments of the present disclosure. FIG. 5 is a block diagram illustrating a coordinate system of a PND according to the first to third embodiments of the present disclosure. FIG. 6 is a block diagram illustrating the function and structure of a control unit of a PND according to the first embodiment of the present disclosure.

Referring to FIG. 3, the PND 10 includes a display unit 12, a storage unit 102, an operating unit 104, a voice output unit 106, a connection interface unit 108, and a navigation function unit 110.

The navigation function unit 110 includes a GPS antenna 112, a Z-axis gyro sensor 114, a Y-axis gyro sensor 116, a three-axis accelerometer sensor 118, a geomagnetic sensor 120, an atmospheric pressure sensor 122, a GPS processing unit 132, an angle calculation unit 134, a position calculation unit 136, a speed calculation unit 138, a posture angle detection unit 140, an orientation calculation unit 142, an altitude calculation unit 144, and a control unit 150.

The display unit 12 is a display device configured to output a display screen for a user. For example, the display screen may be a screen for displaying an icon representing a current position which is marked on map data. Examples of the display unit 12 may include a liquid crystal display (LCD) and an organic electroluminescence display.

The storage unit 102 is a storage medium to store programs configured to operate the PND 10, map data and the like. Examples of the storage unit 102 may include non-volatile memory, such as flash ROM (or flash memory), EEPROM (electrically erasable programmable read-only memory), and EPROM (erasable programmable ROM), magnetic discs, such as hard disc and ferromagnetic disc, optical discs, such as CD (compact disc), DVDR (digital versatile disc recordable) and BD (Blu-ray disc (registered mark)), and recording media, such as MO (magneto-optical) disc. The map data stored in the storage unit 102 may be already stored in the storage unit 102 when the PND 10 is shipped. Further, the map data stored in the storage unit 102 may be acquired by means of a communication unit or a remote medium (not shown).

The operating unit 104 receives an operating instruction from the user and outputs the operating instruction to the navigation function unit 110. Examples of the operating instruction may include setting of a destination, zooming in/out of a map, setting of voice guide, and setting of a screen display. The operating unit 104 may be a touch screen which is integrated with the display unit 12. Further, the operating unit 104 may be a physical part, such as a button, a switch or a lever, which is separated from the display unit 12. In addition, the operating unit 104 may be a signal receiver configured to detect a signal indicating the user's operating instruction which is transmitted from the remote control.

The voice output unit 106 is an output device, such as a speaker, to output voice data. For example, the voice output unit 106 outputs voice guidance for driving lanes or turning directions when the navigation function unit advises the user of a route to a destination. The user may listen to the voice guidance and recognize the drive route without reading the display unit 12.

The connection interface unit 108 is an interface to connect to a speed sensor 60 and a cadence sensor 70. The connection interface unit 108 receives a speed pulse signal from the speed sensor 60 and inputs the received information to the control unit 150. Further, the connection interface unit 108 receives a cadence pulse signal from the cadence sensor 70 and inputs the received information to the control unit 150. The cadence is the number of revolutions of a crank per minute. It is said that cycling at a regular cadence may help increase the energy efficiency.

The positions of the speed sensor 60 and the cadence sensor 70 mounted on the cycle 50 will be described with reference to FIG. 4. The speed sensor 60 is installed at a position where the rotational speed of a rear wheel 52 may be measured. The speed sensor 60 outputs a speed pulse signal each time the rear wheel 52 makes one revolution. The PND 10 may detect the rotational speed of the rear wheel 52, i.e., the cycling speed of the cycle 50 by detecting a pulse interval of the speed pulse signal. The cadence sensor 70 may be installed at a position where the rotational speed of the crank 54 may be measured. The cadence sensor 70 outputs a cadence pulse signal each time the crank 54 makes one revolution. The PND 10 may detect the rotational speed of the crank 54, i.e., the cadence by detecting a pulse interval of the cadence pulse signal.

The GPS antenna 112 may receive GPS signals from a plurality of GPS satellites. The GPS antenna 112 inputs the received GPS signal to the GPS processing unit 132. The GPS signal may include information on the orbit data representing the orbit of the GPS satellite and the transmit time of the GPS signal.

The GPS processing unit 132 calculates position information indicating the current position of the PND 10 based on a plurality of GPS signals input from the GPS antenna 112. The GPS processing unit 132 supplies the calculated position information to the control unit 150. Specifically, the GPS processing unit 132 may calculate the position of each of the GPS satellites from the orbit data obtained by carrying out demodulation on each of the GPS signals. Further, the GPS processing unit 132 may calculate the distance between the PND 10 and each of the GPS satellites from the difference between the transmit time and receive time of each of the GPS signals. As a result, the GPS processing unit 132 may calculate a three-dimensional current position of the PND 10 based on the calculated position of each of the GPS satellites and the calculated distance between the PND 10 and each of the GPS satellites.

The navigation function unit 110 has a function of acquiring a relative position by means of a variety of sensors as well as a function of acquiring an absolute position by means of the GPS antenna 112 and the GPS processing unit 132. The information on the relative position may be used in a situation where the absolute position may not be acquired; for example, in a situation where the PND 10 is placed at a location where the GPS signal may not be received, for example, due to tunnels or woods. Further, the information on the relative position may be used together with the information on the absolute position.

The Z-axis gyro sensor 114 is configured to detect a yaw rate $\omega_z$ of the PND 10 as a voltage value. The yaw rate $\omega_z$ is the angular speed of a movement around the Z-axis of the PND 10 when the PND 10 rotates about the Z-axis. The Z-axis gyro sensor 114 detects the yaw-rate $\omega_z$ at a predetermined sampling frequency and inputs data indicating the detected yaw rate $\omega_z$ to the angle calculation unit 134. As shown in FIG. 5, the Z-axis corresponds to a vertical direction; the X-axis corresponds to a direction where the PND 10 is headed; and the Y-axis corresponds to a horizontal direction which is orthogonal to the X-axis.

The angle calculation unit 134 calculates the angle $\theta$ when the PND 10 rotates about the Z-axis by accumulating the sampling frequency to the yaw-rate co, which is input from the Z-axis gyro sensor 114. The angle calculation unit 134 inputs angle data representing the angle $\theta$ to the position calculation unit 136.

The Y-axis gyro sensor 116 is configured to detect a pitch rate $\omega_y$ of the PND 10 as a voltage value. The pitch rate $\omega_y$ is the angular speed of a movement around the Y-axis of the PND 10. The Y-axis gyro sensor 116 detects the pitch rate $\omega_y$ at a predetermined sampling frequency and inputs data indicating the detected pitch rate $\omega_y$ to the speed calculation unit 138.

The three-axis accelerometer sensor 118 is configured to detect an acceleration $\alpha_x$ along the X axis as a voltage value, an acceleration $\alpha_y$ along the Y axis as a voltage value, and an acceleration $\alpha_z$ along the Z axis as a voltage value. The three-axis accelerometer sensor 118 detects the acceleration $\alpha_x$, the acceleration $\alpha_y$, and the acceleration $\alpha_z$ at a predetermined sampling frequency. The three-axis accelerometer sensor 118 inputs data representing the detected acceleration to the speed calculation unit 138 and the posture angle detection unit 140.

The speed calculation unit 138 is configured to calculate the speed V for the progress direction by dividing the acceleration $\alpha_z$ along the Z axis, which is input from the three-axis accelerometer sensor 118, by the pitch rate $\omega_y$, which is input from the Y-axis gyro sensor 116. The speed calculation unit 138 inputs the calculated speed V to the position calculation unit 136.

The position calculation unit 136 is configured to calculate the position information of the current position based on the speed V calculated by the speed calculation unit 138 and the angle $\theta$ calculated by the angle calculation unit 134. Specifically, the position calculation unit 136 obtains a variation from the position obtained from the previous calculation to the current position based on the speed V and the angle $\theta$. The position calculation unit 136 supplies the variation to the control unit 150.

The posture angle detection unit 140 is configured to detect a predetermined posture angle based on the acceleration data $\alpha_x$, $\alpha_y$, and $\alpha_z$ which are input from the three-axis accelerometer sensor 118. The posture angle detection unit 140 generates posture angle data representing the posture angle of the PND 10 and inputs the posture angle to the orientation calculation unit 142.

The geomagnetic sensor 120 is configured to detect the geomagnetism $M_x$ of the X-axis direction as a voltage value, the geomagnetism $M_y$ of the Y-axis direction as a voltage value, and the geomagnetism $M_z$ of the Z-axis direction as a voltage value. The geomagnetic sensor 120 inputs the detected geomagnetic data $M_x$, $M_y$, and $M_z$ to the orientation calculation unit 142.

The orientation calculation unit 142 performs a predetermined correction operation on the geomagnetic data $M_x$, $M_y$, and $M_z$ which are input from the geomagnetic sensor 120, and generates orientation data representing the orientation of the PND 10 based on the corrected geomagnetic data and the posture angle data which is input from the posture angle detection unit 140. The orientation calculation unit 142 supplies the generated orientation data to the control unit 150.

The geomagnetic sensor 120, the three-axis accelerometer sensor 118, the posture angle detection unit 140, and the orientation calculation unit 142 function as an electronic compass to generate orientation data. The control unit 150 may use the orientation data to provide the user with map data displayed according to the direction of the PND 10 when the PND 10 is used as separated from the cradle 14 (for example, when the PND 10 is used by the user who is walking). For the vehicle mode, the PND 10 may correspond the driving record to roads on the map data and provide the user with map data according to the direction of the PND 10 based on the orientation of the map. The PND 10 may calculate the direction of the PND 10 from the acquired GPS orientation and provide the user with the map data according to the direction.

The atmospheric pressure sensor 122 is configured to detect atmospheric pressure as a voltage value. The atmospheric pressure sensor 122 detects the atmospheric pressure at a predetermined sampling frequency and inputs the detected atmospheric pressure data to the altitude calculation unit 144.

The altitude calculation unit 144 is configured to calculate the altitude of the PND 10 based on the atmospheric pressure data which is input from the atmospheric pressure sensor 122 and supplies the calculated altitude data to the control unit 150.

The control unit 150 generally controls the PND 10. The structure of the control unit 150a according to the first embodiment of the present disclosure will be described with reference to FIG. 6. The control unit 150a includes a measuring unit 151, a position information acquiring unit 153, a start point registering unit 155, a navigation unit 157, and a display controlling unit 159.

The measuring unit 151 is configured to measure a traveling speed and a traveling distance. The measuring unit 151 may calculate the average and maximum values of the traveling speed and the consumed calories using at least one of the traveling speed and the traveling distance. The measuring unit 151 may display a display screen including the traveling speed, the traveling distance, the average and maximum values of the traveling speed, and the consumed calories on the display controlling unit 159. The measuring unit 151 may display an operating screen on the display controlling unit 159 to allow the user to operate functions of the measuring unit 151, and perform the starting and stopping of the measurement and the clearing of accumulation according to the user's operation on the operating screen.

The measuring unit 151 may calculate the traveling speed of the cycle 50 based on the pulse interval of the speed pulse signal which is input from the speed sensor 60. The measuring unit 151 may calculate a cadence based on the pulse interval of the cadence pulse signal which is input from the cadence sensor 70. The measuring unit 151 may measure the traveling speed, the traveling distance and the consumed calories based on the position information acquired by the position information acquiring unit 153.

The position information acquiring unit 153 is configured to acquire position information of a current position of the PND 10. The position information acquiring unit 153 may acquire, for example, information on an absolute position which is supplied from the GPS processing unit 132. The position information acquiring unit 153 may acquire a variation from a position obtained from the previous calculation supplied from the position calculation unit 136 to a current position and calculate the position information according to autonomous navigation. The position information acquiring unit 153 may acquire the orientation of the PND 10 which is supplied from the orientation calculation unit 142. The position information acquiring unit 153 may acquire the altitude data of the PND 10 which is supplied from the altitude calculation unit 144. The position information acquiring unit 153 may acquire the position information on the current position of the PND 10 by selection of some of a variety of acquired information or by combination of a variety of acquired information.

If the PND 10 is operating in a vehicle mode, the position information acquiring unit 153 may specify a driving road and correct the position information to be the position on the driving road by a map matching process based on the acquired current position information and the road network data included in the map data. Further, the position information acquiring unit 153 may acquire accurate position information by performing the correction process on the other position information.

The position information acquiring unit 153 may have a data logging function to record the position information of the acquired current position over time. The recorded information is referred to as movement record information. For example, the position information acquiring unit 153 may generate the movement record information by recording a correspondence between the position information on the current position and the information on the date and time the position information is acquired.

The start point registering unit 155 may store the position information of the current position at a measurement start time when the measuring unit 151 starts the measurement as position information of the start point in the storage unit 102. When the PND 10 is operating in a cycling mode, the start point registering unit 155 may correct the position information of the start point to be a departure point of a cycling road if the current position at the measurement start time when the measuring unit 151 starts the measurement is close to the departure point of the cycling road. In this case, the start point registering unit 155 may correct the position information of the start point to be the departure point of the cycling road when it is determined based on the position information acquired by the position information acquiring unit 153 a predetermined period of time after the measuring unit 151 starts the measurement that the user is riding a cycle on the cycling road.

The navigation unit 157 is configured to control operations related to navigation functions. For example, the navigation unit 157 may function as a part for setting a destination. For example, the navigation unit 157 may set one of registered points, which is selected by the user, as a destination. The navigation unit 157 may set a point on a map displayed by the display unit 12, which is designated by the user, as a destination. The navigation unit 157 may search for a desired point by a searching method, such as address searching, phone number searching, keyword searching or genre searching, and set the desired point as a destination. In the present embodiment, if an operation to return to the start point is detected, the navigation unit 157 may set the start point, which is registered by the start point registering unit 155, as a destination.

The navigation unit 157 may function as a part for searching for a route. For example, if a destination is set, the navigation unit 157 may search for a route from the current position to the destination using the position information acquired by the position information acquiring unit. The navigation unit 157 may search for an appropriate route according to an operation mode. The operation mode may be changed, for example, according to the user's operation. The operation mode may be automatically changed to a walking mode if the PND 10 is removed from the cradle 14. For example, the PND 10 operating in a vehicle mode may search for a route including a highway. Further, the PND 10 operating in the vehicle mode may predict congested area and search for a route excluding the congested areas. The PND 10 operating in the walking mode may use map data for walking other than map data for vehicles to search for a route for walking for underground passages, station concourses, sidewalk bridges or parks. The PND 10 operating in a cycling mode may set a route for cycles. For example, the PND 10 operating in the cycling mode may search for a route appropriate for cycles since the PND 10 searches for routes which are difficult for vehicles to pass through. The navigation unit 157 may search for multiple routes to a designated destination. In this case, the navigation unit 157 may display a display screen including the multiple routes and the map data, which overlap each other, on the display unit 152. The display screen is generated by the display controlling unit 150. If the user selects several routes on the display screen, the navigation unit 157 starts guidance of a course according to the selected route.

The navigation unit 157 may show the user the route to travel on through the display screen and the voice guide when advising the user of the course according to the selected route. For example, the navigation unit 157 may advise the user of the course by displaying an arrow mark indicating the turning direction on the map right before the user arrives at a crossroad where the user has to turn. In this case, the navigation unit 157 may provide the user with information on the turning direction by the voice guide. If the navigation unit 157 detects the user entering a route other than the guided route from the position information of the current position while advising the user of the course according to the route to the destination, the navigation unit 157 may automatically search for another route from a current position to the destination. The navigation unit 157 may automatically start the guidance of the course according to the searched route.

If an operation to return to a start point is detected after the start point registering unit 155 registers the start point when the measuring unit 151 starts the measurement, the navigation unit 157 may reset a current point, which is determined at the time when the operation is detected, as a departure point, reset the start point as a destination, and search for a route from the current point (the departure point) to the destination (hereinafter referred to as "return route"). In comparison with the return route, a route from the start point to the current point where the operation to return to the start point is detected will be referred to as a traveled route.

In this case, the navigation unit 157 may estimate the traveling time of the return route based on the traveling time of the traveled route which is measured by the measuring unit 151.

Further, the navigation unit 157 may analyze attributes of the traveled route based on a variety of information on the traveled route measured by the measuring unit 151 and search for the return route taking the attributes into account according to the user's operation. The route search "taking the attributes into account" will be described. For example, the navigation unit 157 may analyze the traveling time of the traveled route and search for a return route taking a shorter or longer traveling time than that of the traveled route. The navigation unit 157 may refer to the traveling time of the traveled route and search for a return route taking a shorter or longer time than that of the traveled route. The navigation unit 157 may refer to consumed calories or slope information and search for a return route that is easier or tougher to travel on than the traveled route. The navigation unit 157 may refer to information on the consumed calories on the traveled route which is calculated by the measuring unit 151 and search for a return route taking more or less consumed calories than that of the traveled route. The navigation unit 157 may refer to the traveling distance of the traveled route and search for a return route having a shorter or longer traveling distance than that of the traveled route.

The display controlling unit 159 is configured to control a display screen displayed by the display unit 12. The display controlling unit 159 generates a display screen and displays the display screen on the display unit 12. For example, if the measuring unit 151 starts the measurement, the display controlling unit 159 may generate a display screen including an operating button (first operating button) to perform a function of searching for a return route from a current point to a start point as a destination and display the display screen on the display unit 12. If the operation of the first operating button is detected, the navigation unit 157 may search for the return route. If the navigation unit 157 predicts the traveling time of the return route, the display controlling unit 159 may generate a display screen including an estimated arrival time of the destination of the return route which is calculated based on the predicted traveling time and display the display screen on the display unit 12.

In the foregoing, an example of the function of the PND 10a according to the present embodiment has been described. Each of the elements may be made up of typical components or circuits or made up of hardware specialized for functions of each of the elements. In addition, the functions of each of the elements may be implemented by reading and analyzing control programs describing the processing procedure of the functions implemented by an operation device, such as CPU (central processing unit), from a recording medium, such as ROM (read-only memory) or RAM (random access memory), that stores the control programs. Accordingly, it is possible to adequately reconfigure the structure according to the level of technique of implementing the present embodiment. For example, according to an embodiment, some of the functions of the PND 10a related to the above-mentioned example may be omitted or a new function may be added to the PND 10a.

In addition, a computer program to implement the above-mentioned functions of the PND 10a according to the present embodiment may be made and installed in a personal computer or the like. In addition, a computer-readable recording medium storing the computer program may be provided. Examples of the recording medium may include a magnetic disc, an optical disc, a magneto-optical disc, or flash memory. The computer program may be transmitted, for example, through a network instead of using the recording medium.

(1-3. Example of Operation)

Figure 7:
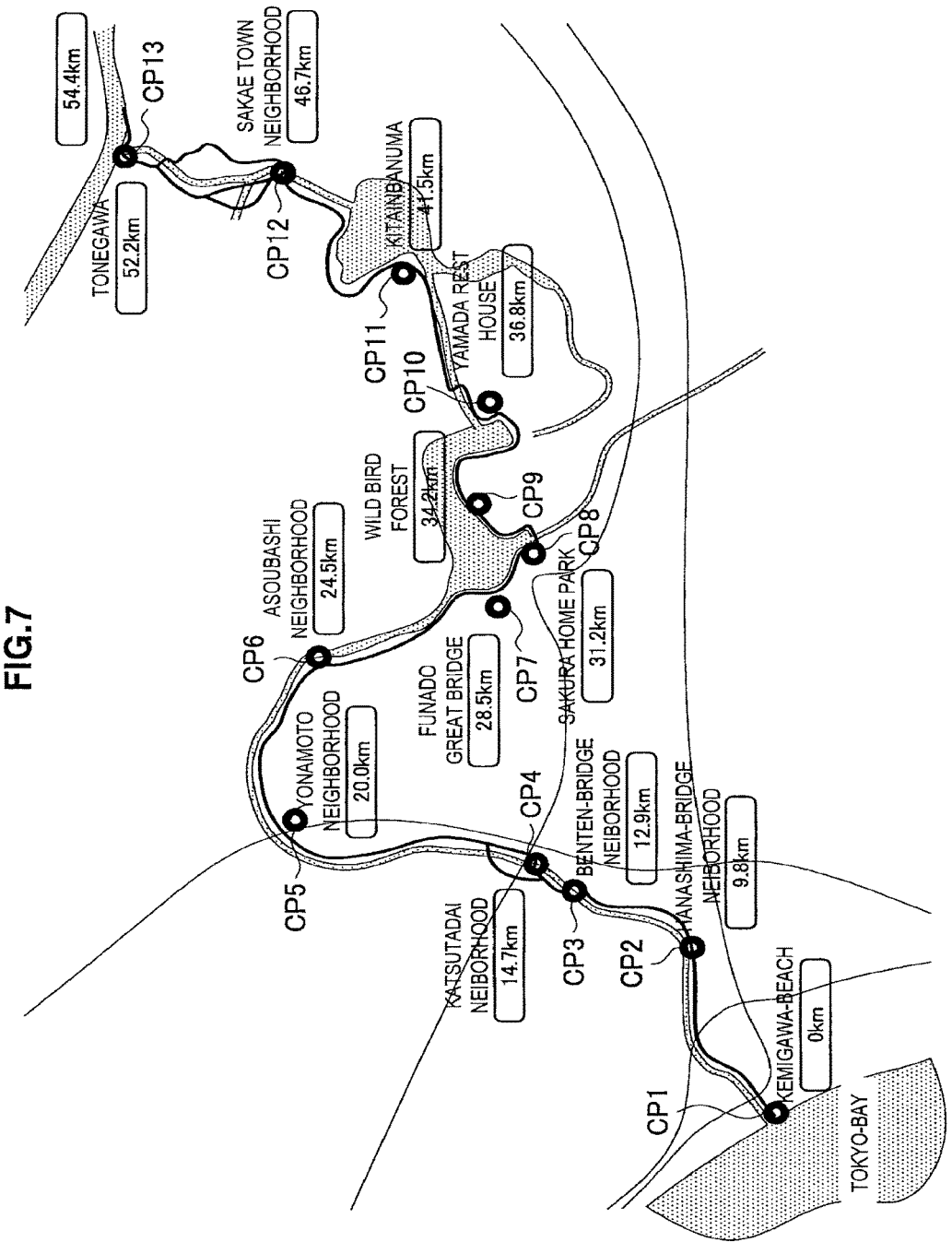
FIG. 7 is a view illustrating a cycling road which is used to describe the first embodiment of the present disclosure.
Figure 8:
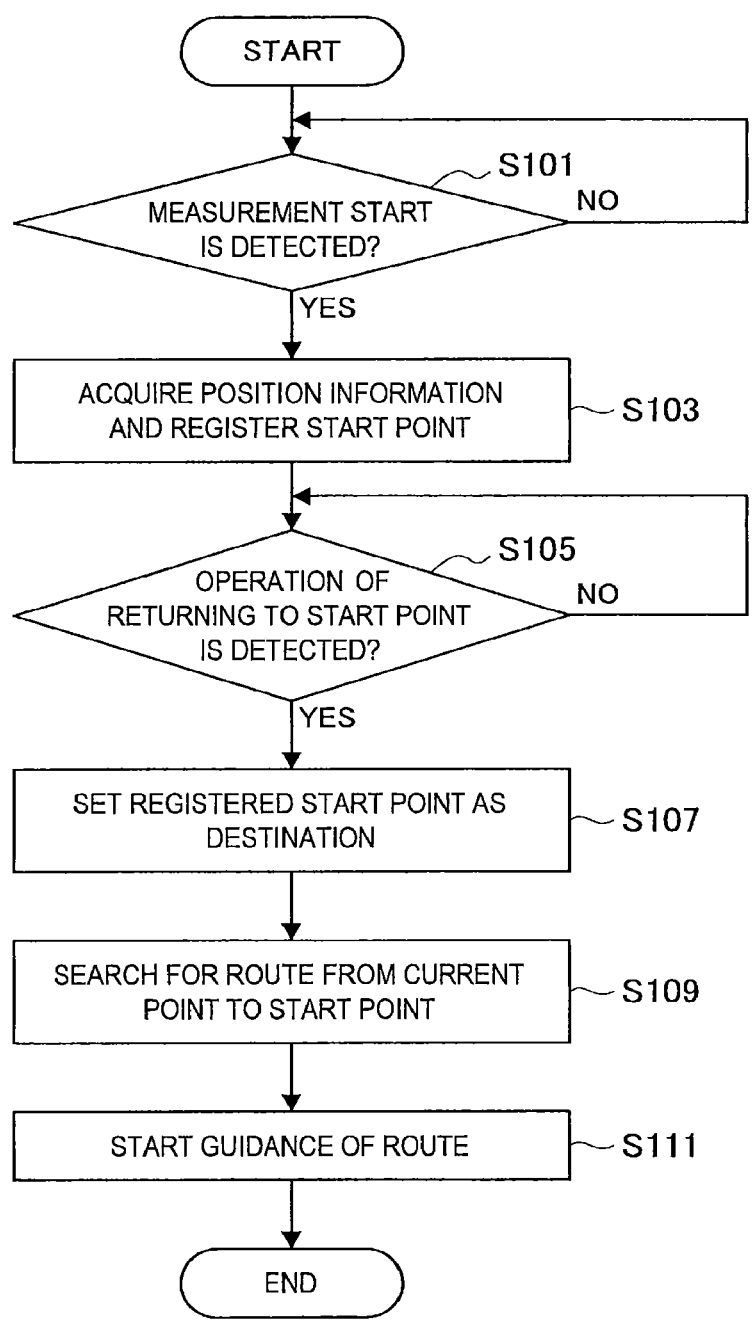
FIG. 8 is a flow chart illustrating an operation of a PND according to the first embodiment of the present disclosure.
Figure 9:
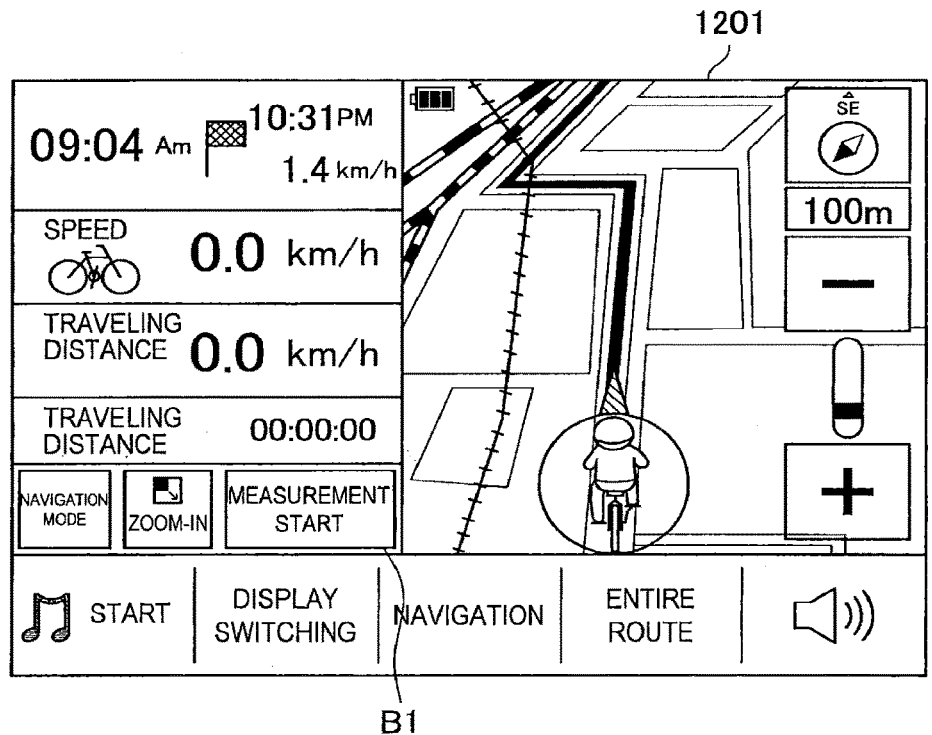
FIG. 9 is a view illustrating a display screen prior to the measurement of a PND according to the first embodiment of the present disclosure.
Figure 10:
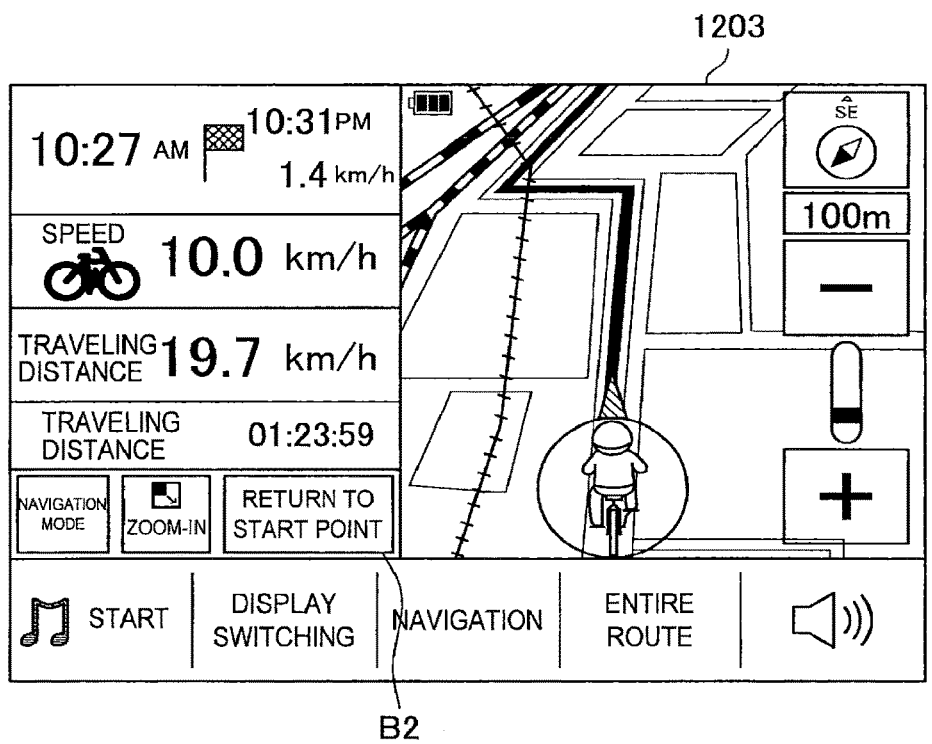
FIG. 10 is a view illustrating a display screen of a PND after starting the measurement according to the first embodiment of the present disclosure.
Figure 11:
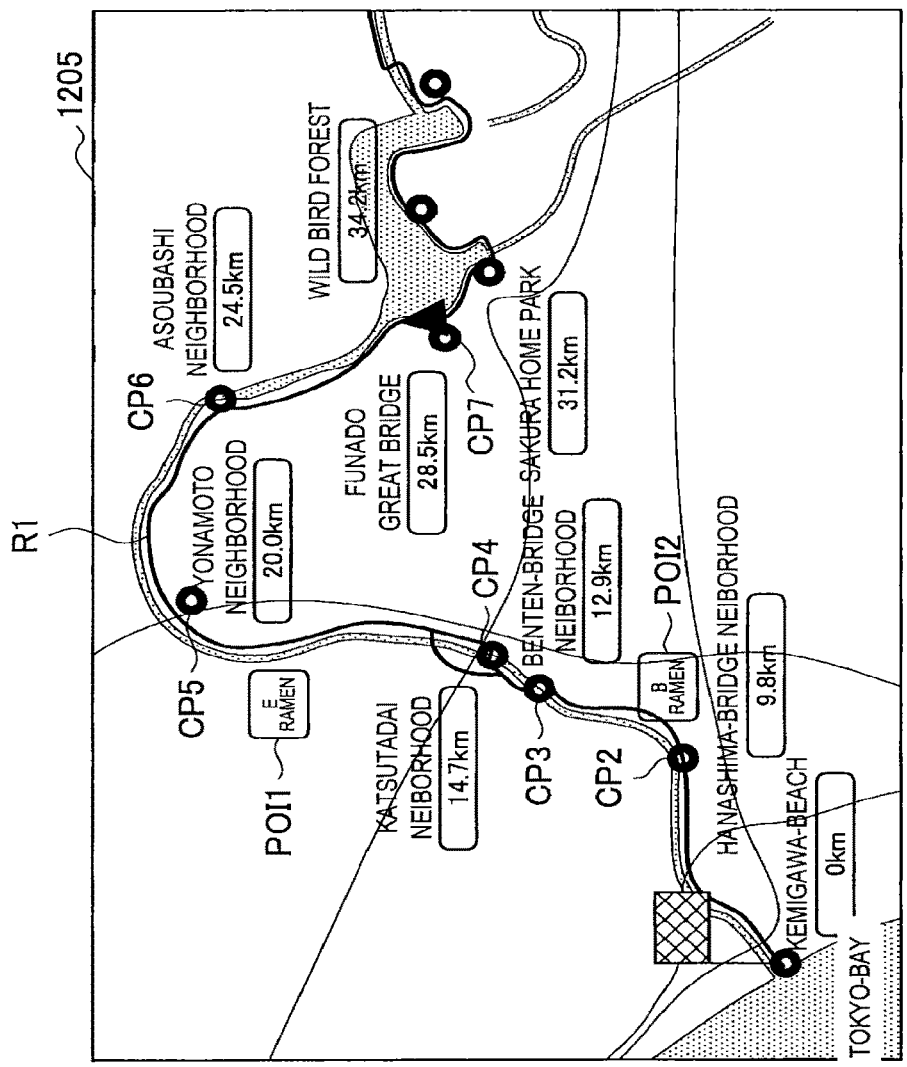
FIG. 11 is a view illustrating a display screen of a PND after searching for a return route according to the first embodiment of the present disclosure.
Figure 12:
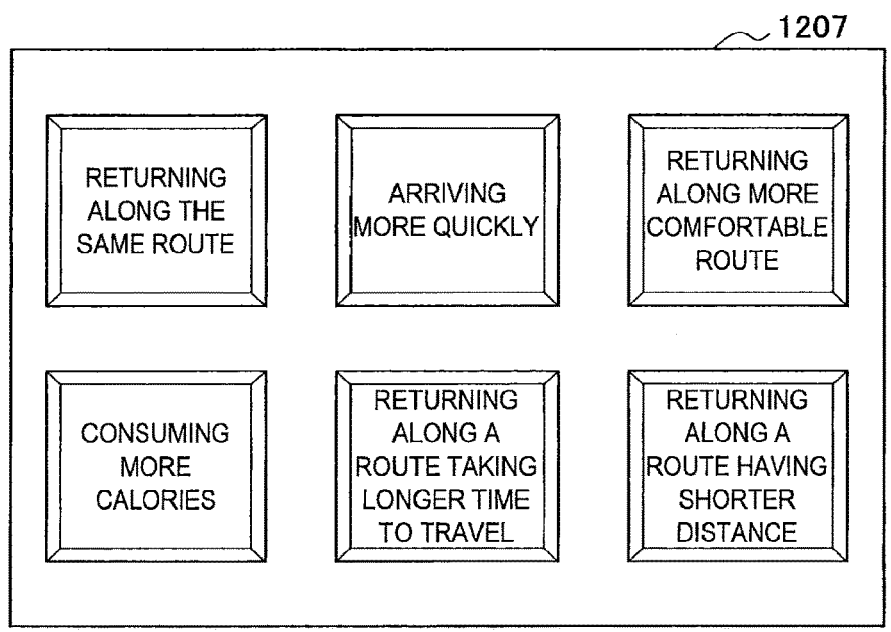
FIG. 12 is a view illustrating a display screen of a PND for selecting searching conditions of a return route according to the first embodiment of the present disclosure.

An example of the operation of the PND 10a according to the first embodiment of the present disclosure will be described with reference to FIGS. 7 to 12. FIG. 7 is a view illustrating a cycling road which is used to describe the first embodiment of the present disclosure. FIG. 8 is a flow chart illustrating an operation of the PND according to the first embodiment of the present disclosure. FIG. 9 is a view illustrating a display screen prior to the measurement of the PND according to the first embodiment of the present disclosure. FIG. 10 is a view illustrating a display screen of the PND after starting the measurement according to the first embodiment of the present disclosure. FIG. 11 is a view illustrating a display screen of the PND after searching for a return route according to the first embodiment of the present disclosure. FIG. 12 is a view illustrating a display screen of a PND for selecting searching conditions of a return route according to the first embodiment of the present disclosure.

In order to describe an operation example of the PND 10a, it is assumed that the user installs the PND 10a in his/her cycle and rides the cycle on a cycling road as shown in FIG. 7. If the user's home is located a little far from the cycling road, the user may load the cycle in his/her car and move near a start point of the cycling road. In this case, the user parks his/her car in a parking lot near to the start point and starts riding his/her cycle on the cycling road. If the user intends to use the measuring function of the PND 10a, the user starts the measurement at the start point by operating a measurement start button. In this case, after cycling, the user may return to the parking lot around the start point, load the cycle in his/her car and return home. The user may not travel by his/her cycle from the start point to a goal point of the cycling road. Even though the user enjoys cycling with co-workers, they may individually return at their desired points and gather at the start point. Accordingly, the user riding the cycle having the PND 10a installed therein potentially desires to easily search for a route to return to the start point.

For example, it may be assumed that the user starts measuring the traveling speed or traveling distance at the start point CP1, travels to the check point CP7 along the cycling road, and returns to the start point from the check point CP7.

Referring to FIG. 8, it is determined in operation S101 whether or not the start point registering unit 155 detects that the measuring unit 151 starts the measurement. For example, the display controlling unit 159 controls the display unit 12 to display the display screen 1201 shown in FIG. 9 before starting the measurement. The display screen 1201 includes a measurement start button B1. The user may operate the measurement start button B1 for the measuring unit 151 to start the measurement. If the start point measuring unit 155 detects the measurement start of the measuring unit 155, the start point registering unit 155 registers position information of a current point at the time when the measurement start is detected as position information of the start point in operation S103. The position information is acquired by the position information acquiring unit 153.

After the user performs the measurement start operation, the display controlling unit 159 controls the display unit 12 to display a display screen 1203 (FIG. 10) including a button B2 for returning to the start point. The display controlling unit 159 determines in operation S105 whether or not the operation of returning to the start point is detected according to whether or not the operation of the button B2 for returning to the start point is detected. If the operation of returning to the start point is determined as detected in operation S105, the navigation unit 157 sets the start point registered in operation S103 as a destination in operation S107. In operation S109, the navigation unit 157 searches for a return route from a current point at the time when the operation of returning to the start point is detected to the start point. In operation S111, the navigation unit 157 starts guidance of the course of the searched return route.

FIG. 11 illustrates an example of the display screen 1205 which is displayed after the return route is searched in operation S109 of FIG. 8. The display screen 1205 illustrates the return route from the check point CP7 as the current point to the start point CP1. In this example, the return route is the same as the traveled route. The display screen 1205 may include information on an estimated arrival time which is calculated based on the time taken for the user to move along the traveled route.

After detecting the operation of returning to the start point in operation S105 of FIG. 8, the display controlling unit 159 may control the display unit 12 to display a selection screen 1207 for selecting a return route search condition shown in FIG. 12. In this case, the navigation unit 157 may set a search condition of the return route based on the user's operation on the selection screen 1207.

For example, the selection screen 1207 may be configured for the user to have an option to return along the same route as the traveled route, an option to search for a route to arrive at the start point more quickly than the traveled route, an option to search for a route more comfortable to travel than the traveled route, an option to search for a route taking a more calorie consumption than the traveled route, an option to search for a route taking longer time to travel than the traveled route, or an option to search for a route having a shorter distance than the traveled route. For example, if the user operates a button for "returning along the same route", the navigation unit 157 may refer to movement record information which is recorded during traveling and search for a return route tracing backwards the same route as the traveled route. If the user operates a button for "arriving more quickly", the navigation unit 157 may refer to the traveling time of the traveled route which is measured by the measuring unit 151 and search for a return route taking less time to travel than the traveled route. If the user operates a button for "returning along a more comfortable route", the navigation unit 157 may refer to the consumed calories measured by the measuring unit 151 or the undulation of the traveled route (slope information) acquired from the map data and search for a return route which is more comfortable to travel than the traveled route. If the user operates a button for "consuming more calories", the navigation unit 157 may refer to the consumed calories of the traveled route which is calculated by the measuring unit 151 and search for a return route taking a more calorie consumption than the traveled route. If the user operates a button for "returning along a route taking longer time to travel", the navigation unit 157 may refer to the traveling time of the traveled route measured by the measuring unit 151 and search for a return route taking longer time than the traveled route. If the user operates a button for "returning along a route having a shorter distance", the navigation unit 157 may refer to the traveling distance of the traveled route measured by the measuring unit 151 and search for a return route having a shorter traveling distance than the traveled route.

(1-4. Example of Effect)

In the foregoing, the PND 10a according to the first embodiment of the present disclosure has been described. The PND 10a includes the start point registering unit 155 which registers a current point at the time when the user starts the measurement as a start point. A navigation device having not such a function has to separately perform an operation of starting the measuring function and an operation of registering a point. Accordingly, the user has to stop traveling at the start point to register the start point, and switch to a screen for operating the measuring function to perform the measurement start operation. However, the PND 10a having the above-mentioned function automatically registers position information of the location of the measurement start operation without the user's interference if the user has only to perform the measurement start operation. Accordingly, the user does not have to separately perform the measurement start operation and the point registration operation since the start point may be automatically registered if the user has only to perform the measurement start operation. The PND 10a may display an operating button for returning to the start point on the screen after starting the measurement function. If the user operates the operating button, the PND 10a may automatically search for a return route from a current point at the time when the operation of returning to the start point is performed to the start point and provide the user with the return route. For a navigation device having not such a function, even though the start point is registered, the user may return to the start point by switching to a navigation screen, finding the start point from a list of registered points, and setting the start point as a destination. However, the PND 10a having the above-mentioned function automatically provides the user with a return route to return to the start point if the user has only to operate the operating button for returning to the start point.

2. Second Embodiment (2-1. Function and Structure)

Figure 13:
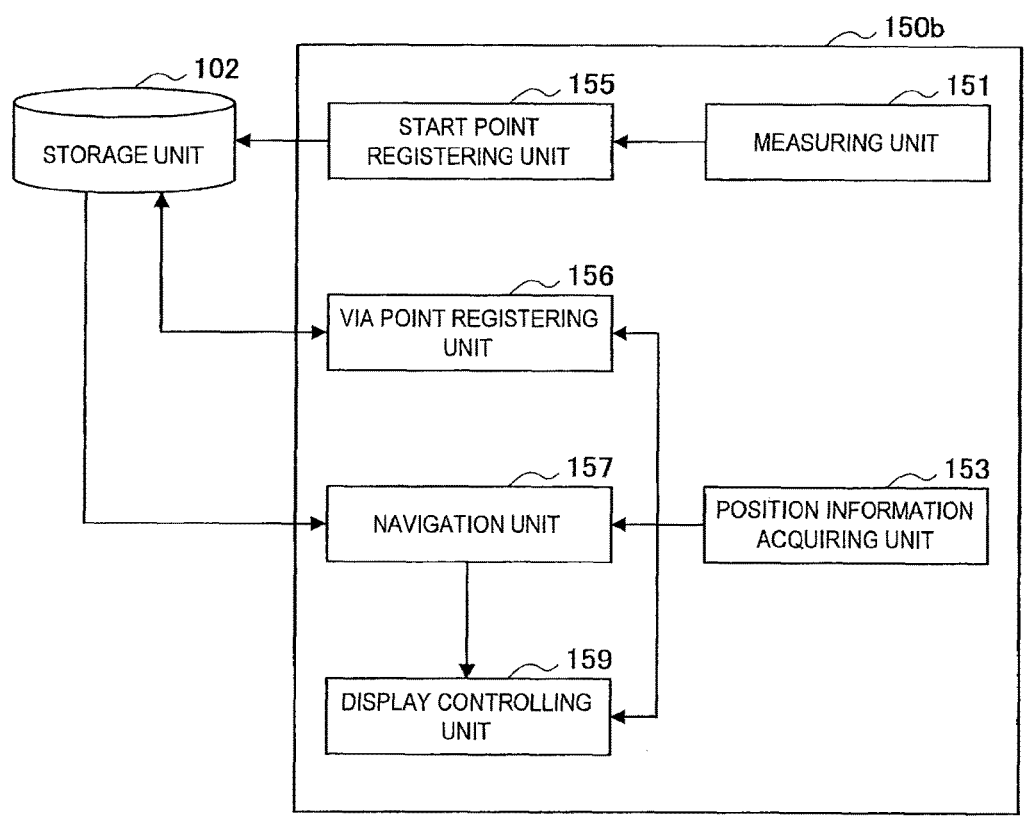
FIG. 13 is a block diagram illustrating the function and structure of a control unit of a PND according to the second embodiment of the present disclosure.
Figure 14:
FIG. 14 is a view illustrating a personal data setup screen of a PND according to the second embodiment of the present disclosure.
Figure 15:
FIG. 15 is a view illustrating a desired genre setting screen of a PND according to the second embodiment of the present disclosure.
Figure 16:
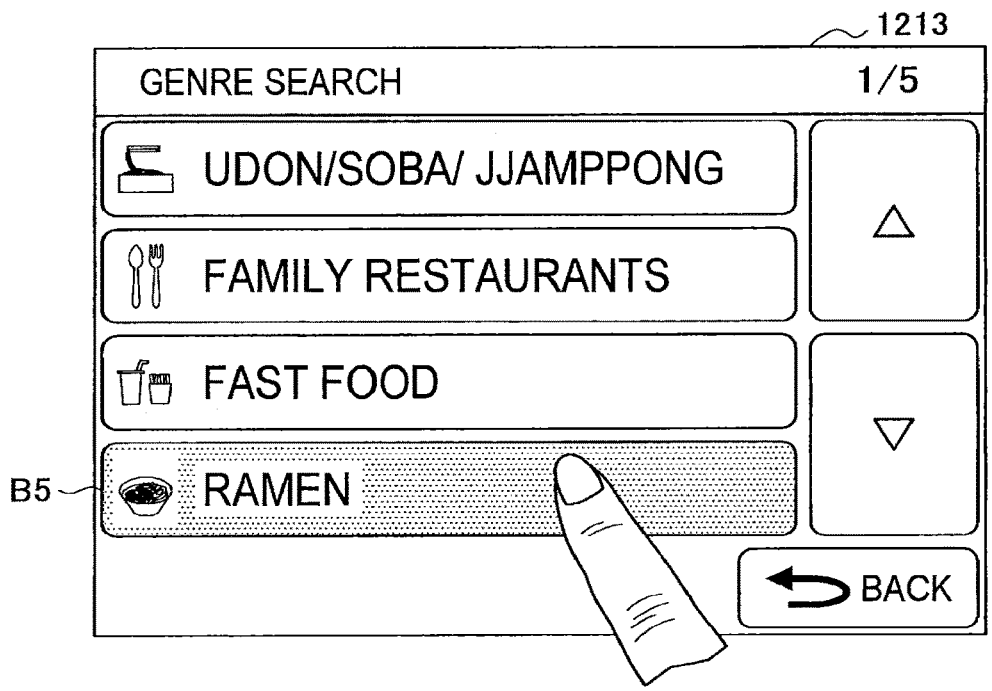
FIG. 16 is a view illustrating another desired genre setting screen of a PND according to the second embodiment of the present disclosure.
Figure 17:
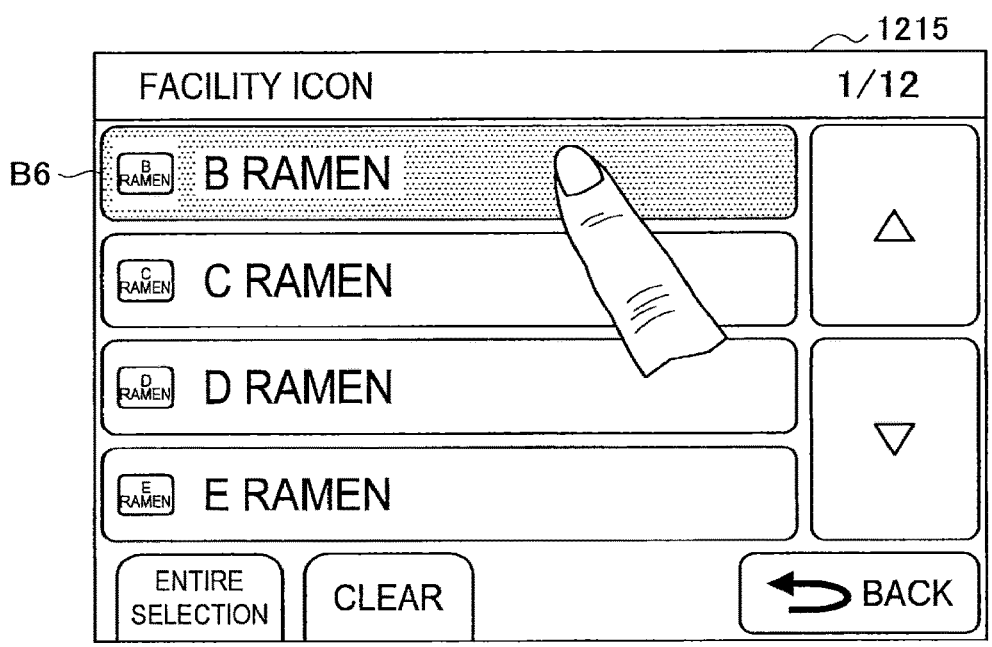
FIG. 17 is a view illustrating another desired genre setting screen of a PND according to the second embodiment of the present disclosure.

The function and structure of the PND 10b according to the second embodiment of the present disclosure will be described with reference to FIGS. 13 to 18. FIG. 13 is a block diagram illustrating the function and structure of a control unit of a PND according to the second embodiment of the present disclosure. FIG. 14 is a view illustrating a personal data setup screen of the PND according to the second embodiment of the present disclosure. FIG. 15 is a view illustrating a desired genre setting screen of the PND according to the second embodiment of the present disclosure. FIG. 16 is a view illustrating another desired genre setting screen of the PND according to the second embodiment of the present disclosure. FIG. 17 is a view illustrating another desired genre setting screen of the PND according to the second embodiment of the present disclosure. FIG. 18 is a view illustrating a list of registered points of the PND according to the second embodiment of the present disclosure.

The external appearance and general structure of the PND 10b are the same as those of the PND 10a according to the first embodiment of the present disclosure. The first embodiment of the present disclosure has been described above with reference to FIGS. 1 to 5 and a detailed description thereof will thus be omitted herein. The structure of the control unit 150b will be described in detail.

The control unit 150b includes the measuring unit 151, the position information acquiring unit 153, the start point registering unit 155, a via point registering unit 156, the navigation unit 157, and the display controlling unit 159. The measuring unit 151, the position information acquiring unit 153, and the start point registering unit 155 are the same as those of the PND 10a according to the first embodiment of the present disclosure and a detailed description thereof will thus be omitted. Further, a detailed description of the same ones of the following elements as those of the PND 10a according to the first embodiment of the present disclosure will be omitted.

The via point registering unit 156 registers some of points near the current point during traveling, which belong to a predetermined category, as a via point. The via point registering unit 156 may refer to information on a preset via point category and information on a point of interest (POI) near the current point and extract a POI belonging to the preset category to register the POI as a via point.

The via point category information is set, for example, by the user performing the following operation. The user operates a button B3 for changing a desired genre on the personal data setting screen 1209 shown in FIG. 14. If the user operates the button B3, a genre search screen 1211 is displayed as shown in FIG. 15. The user selects a facilities genre on the genre search screen 1211. In this example, the user operates a button B4 for "foods" genre. In this case, a genre search screen 1213 including a plurality of subgenres, which is a lower genre of the foods genre, is displayed as shown in FIG. 16. The user selects a desired subgenre on the genre search screen 1213. In this example, the user operates a button B5 for "Ramen" genre. In this case, a facility icon select screen 1215 may be displayed as shown in FIG. 17. For example, the facility icon select screen 1215 may display a list of names of ramen stores. If the user operates a "general select" button on the facility icon select screen 1215, the user may set all of facilities belonging to the ramen stores as the via point category. Further, if the user operates a button B6 for B ramen, the user may only set ramen stores, which are classified as the facility named "B ramen", as the via point category.

The via point category information may include a predetermined category regardless of the user's setting operation. For example, when the PND 10b is operating in a cycling mode, the via point category information may include check points of cycle shops and cycling roads. For example, if positions of cycle shops around the traveled route are automatically registered as via points when the PND 10b is operating in the cycling mode, the positions of the cycle shops may be promptly displayed when the cycle gets out of order.

The via point registering unit 156 may register via points by, for example, adding an extracted via point to a list of registered points as shown in FIG. 18. The list of registered points includes information specifying the positions of the registered points. Examples of the information specifying the positions of registered points may include position information indicating latitude and longitude.

The navigation unit 157 may include the following functions in addition to the functions described in the first embodiment. If the navigation unit 157 detects an operation of returning to a via point, the navigation unit 157 may search for a route to return to the via point as a destination by setting a current point at the time when the operation of returning to the via point is detected as a start point and setting the via point as the destination. In this case, the navigation unit 157 may search for multiple routes. The navigation unit 157 may start guidance of the course according to a selected one of the searched multiple routes.

The display controlling unit 159 may include the following functions in addition to the functions described in the first embodiment. If the via point registering unit 156 registers a via point, the display controlling unit 159 may control the display unit 12 to display a display screen including an operating button (second operating button) to perform a function of searching for a route to return to the registered via point. If the navigation unit 157 detects the operation of the operating button, the navigation unit 157 may search for a route to return to the via point. If the display controlling unit 159 detects the operation of the second operating button, the display controlling unit 159 may control the display unit 12 to display a display screen including a list of registered points. As shown in FIG. 11, the display controlling unit 159 may control the display unit 12 to display icons indicating registered via points, such as P011 and P012, on the display screen 1205 indicating the return route R1.

In the foregoing, an example of the function of the PND 10b according to the second embodiment of the present disclosure has been described. Each of the elements may be made up of typical components or circuits or made up of hardware specialized for functions of each of the elements. In addition, the functions of each of the elements may be implemented by reading and analyzing control programs describing the processing procedure of the functions implemented by an operation device, such as CPU (central processing unit), from a recording medium, such as ROM (read-only memory) or RAM (random access memory), that stores the control programs. Accordingly, it is possible to adequately reconfigure the structure according to the level of technique of implementing the present embodiment. For example, according to an embodiment, some of the functions of the PND 10b related to the above-mentioned example may be omitted or a new function may be added to the PND 10b.

In addition, a computer program to implement the above-mentioned functions of the PND 10b according to the present embodiment may be made and installed in a personal computer or the like. In addition, a computer-readable recording medium storing the computer program may be provided. Examples of the recording medium may include a magnetic disc, an optical disc, a magneto-optical disc, or flash memory. The computer program may be transmitted, for example, through a network instead of using the recording medium.

(2-2. Example of Operation)

Figure 19:
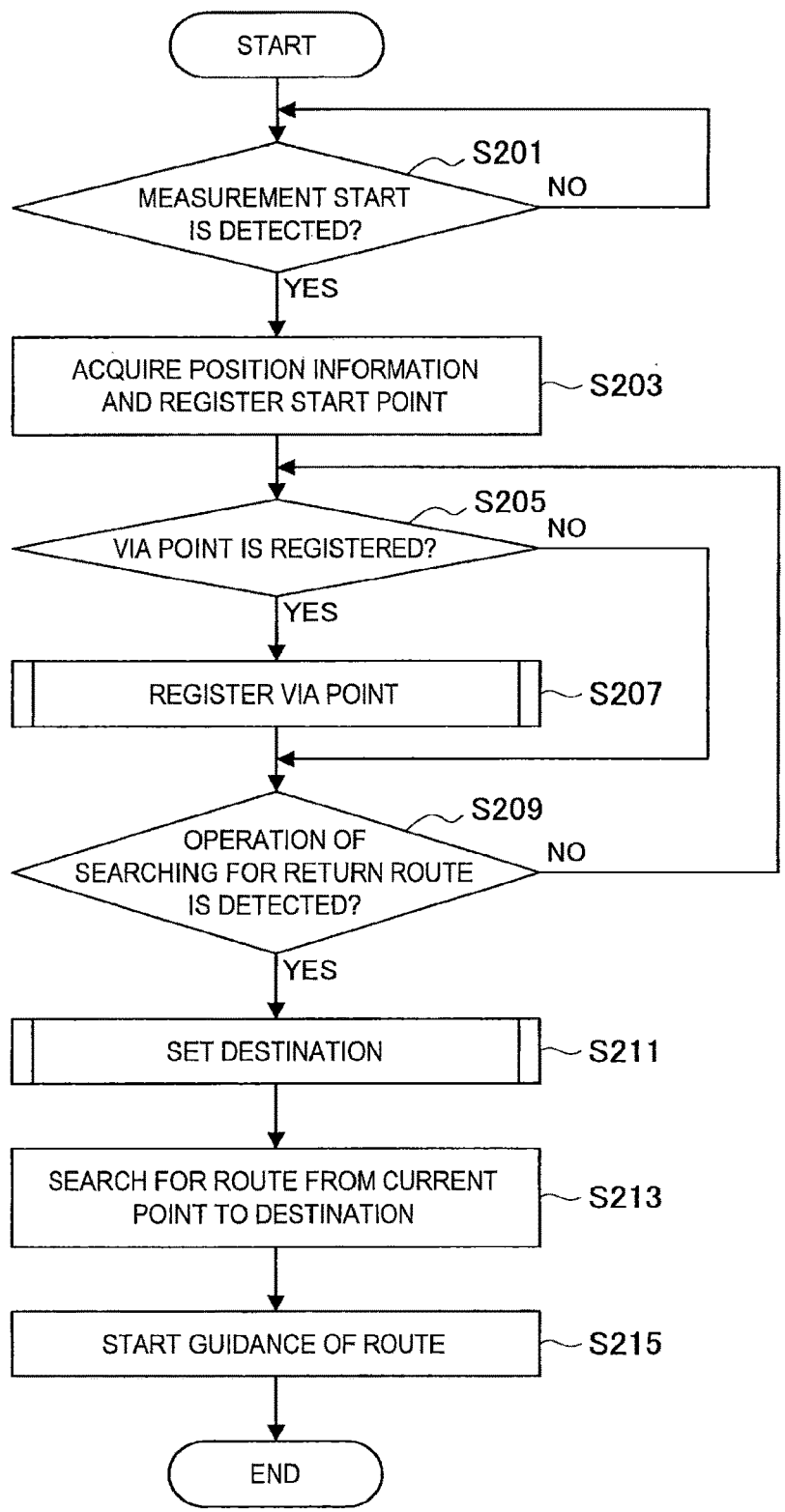
FIG. 19 is a flow chart illustrating an operation of a PND according to the second embodiment of the present disclosure.
Figure 20:
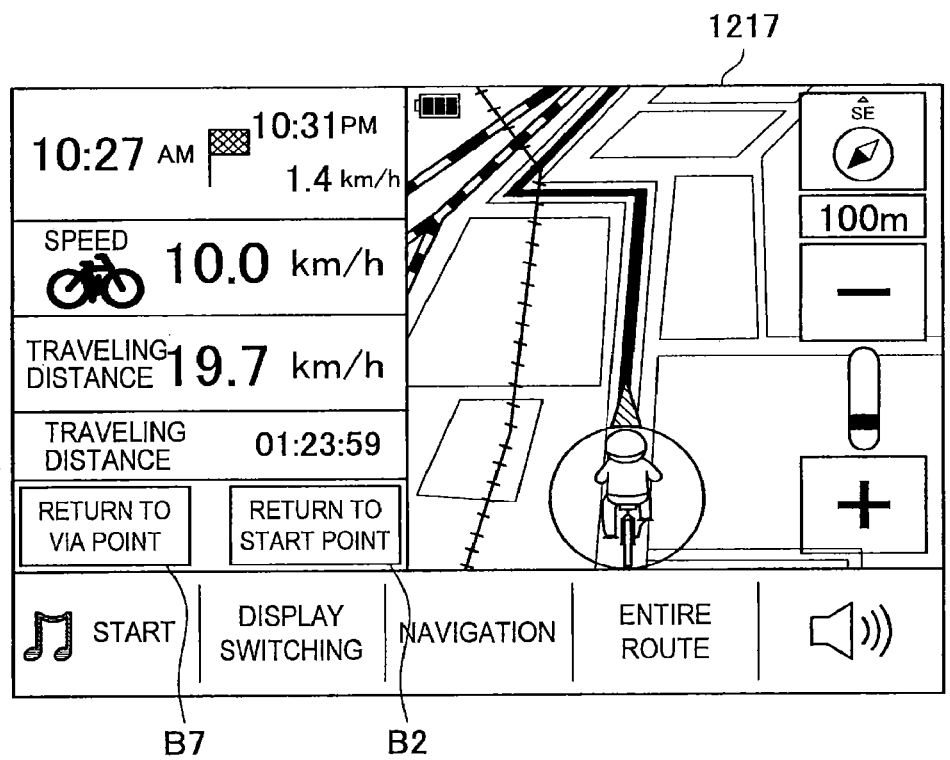
FIG. 20 is a view illustrating a display screen of a PND after starting the measurement according to the second embodiment of the present disclosure.
Figure 21:
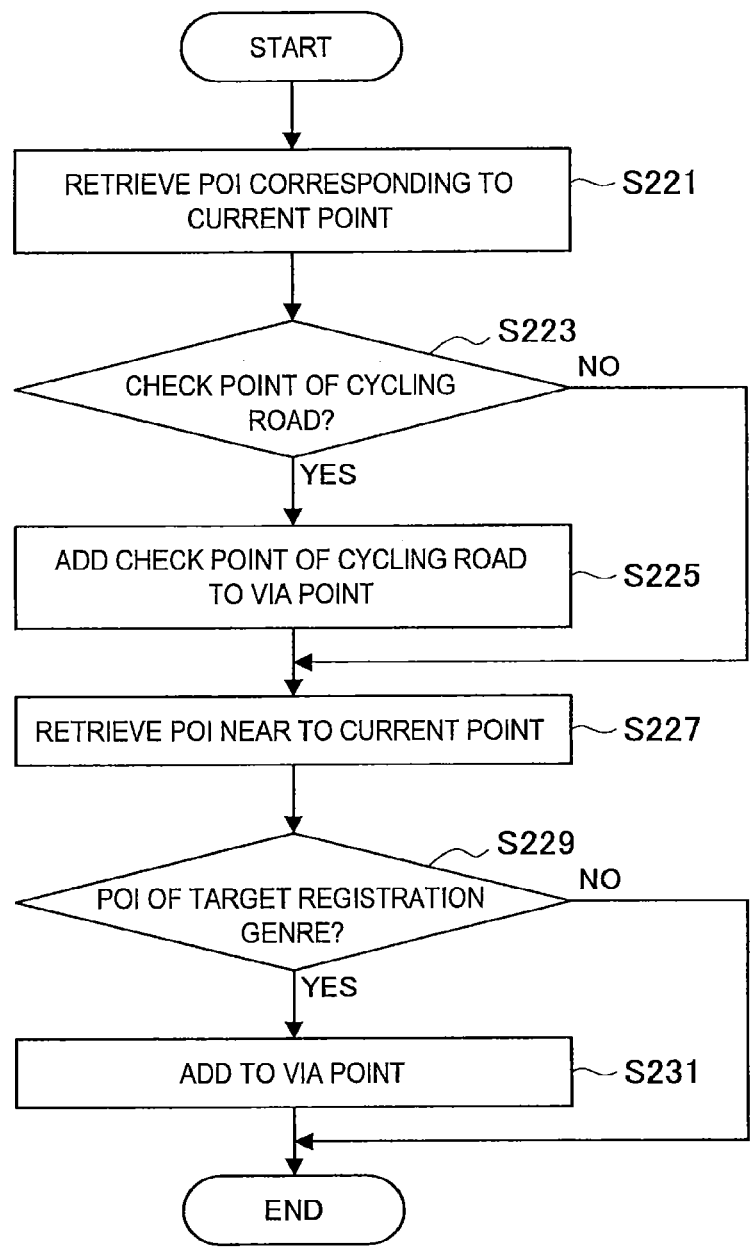
FIG. 21 is a flow chart illustrating an operation of registering a via point of a PND according to the second embodiment of the present disclosure.
Figure 22:
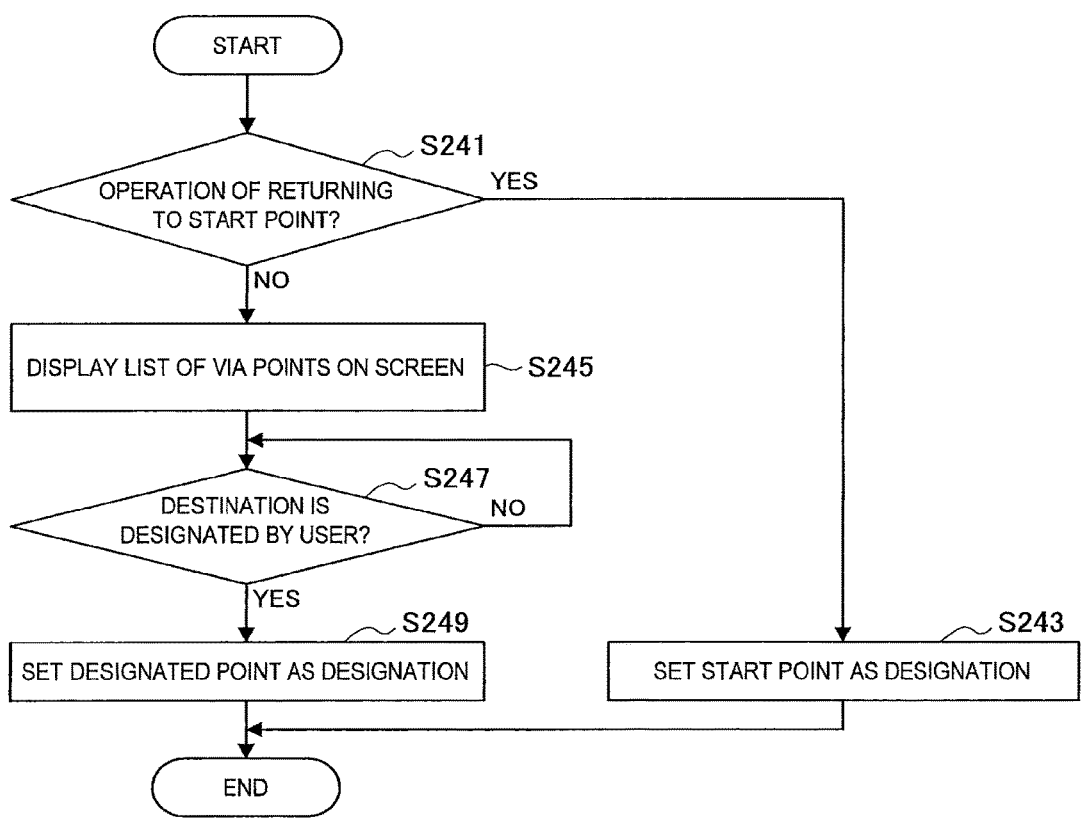
FIG. 22 is a flow chart illustrating an operation of setting a returning point of a PND according to the second embodiment of the present disclosure.

An example of the operation of the PND 10b according to the second embodiment of the present disclosure will be described with reference to FIGS. 19 to 22. FIG. 19 is a flow chart illustrating an operation of a PND according to the second embodiment of the present disclosure. FIG. 20 is a view illustrating a display screen of a PND after starting the measurement according to the second embodiment of the present disclosure. FIG. 21 is a flow chart illustrating an operation of registering a via point of a PND according to the second embodiment of the present disclosure. FIG. 22 is a flow chart illustrating an operation of setting a returning point of a PND according to the second embodiment of the present disclosure.

Like the first embodiment, it is also assumed in the second embodiment that the user installs the PND 10b in his/her cycle 50 and rides the cycle 50 on the cycling road as shown in FIG. 7. In addition, it is assumed that the user performs an operation of returning to a start point or a via point on the cycling road while riding the cycle on the cycling road.

Referring to FIG. 19, it is determined in operation S201 whether or not the start point registering unit 155 detects that the measuring unit 151 starts the measurement. For example, the display controlling unit 159 controls the display unit 12 to display the display screen 1201 shown in FIG. 9 before starting the measurement. The display screen 1201 includes a measurement start button B1. The user may operate the measurement start button B1 for the measuring unit 151 to start the measurement. If the start point measuring unit 155 detects the measurement start of the measuring unit 155, the start point registering unit 155 registers position information of a current point at the time when the measurement start is detected as position information of the start point in operation S203. The position information is acquired by the position information acquiring unit 153.

In operation S205, the via point registering unit 156 determines whether or not to register a via point. The via point registering unit 156 may refer to, for example, via point category information and perform the operation S205 based on whether or not a preset category is present. The via point registering unit 156 may perform the operation S205 based on whether or not an operation of registering the via point is preset. If it is determined in operation S205 that the via point is registered, the via point registering unit 156 performs the registration operation of the via point in operation S207 by extracting a POI indicating a point belonging to a preset genre and adding the POI to a list of registered points. The registration operation of the via point will be described in detail with reference to FIG. 21.

After the user starts traveling, the display controlling unit 159 may control the display unit 12 to display a display screen 1217 (FIG. 20) including the button B2 for returning to the start point and the button B7 for returning to the via point. In operation S209, the display controlling unit 159 determines whether or not the operation of searching for a return route is detected based on whether or not either the operation of the button B2 for returning to the start point or the operation of the button B7 for returning to the via point is detected.

If it is determined in operation S209 that the operation of searching for the return route is detected, the navigation unit 157 performs an operation of setting a destination in operation S211. The operation of setting the destination will be described in detail with reference to FIG. 22. As a result of the operation of setting the destination in operation S211, either the start point or the via point is set as the destination.

In operation S213, the navigation unit 157 searches for a route from the current point to the destination. In operation S215, the navigation unit 157 starts guidance of the course of the searched route.

The operation of registering the via point in operation S207 of FIG. 19 will be described in detail with reference to FIG. 21. In operation S221, the via point registering unit 156 retrieves a POI corresponding to the current point from POI information based on the position information of the current point. In operation S223, the via point registering unit 156 determines whether or not the POI extracted from the retrieval in operation S221 is a check point of the cycling road. If the POI is determined as a check point of the cycling road in operation S223, the via point registering unit 156 adds the extracted POI as the via point in operation S227.

In operation S227, the via point registering unit 156 retrieves a POI near the current point from the P01 information. In operation S229, the via point registering unit 156 determines whether or not the extracted POI from the retrieval in the operation S227 is a POI of a target registration genre. If the extracted POI from the retrieval in the operation S227 is determined as a POI of the target registration genre in the operation S229, the via point registering unit 156 adds the extracted POI from the retrieval in the operation S227 as the via point in operation S231.

In the foregoing, the registering operation of the via point has been described. The operation of setting the destination in operation S211 of FIG. 19 will be described in detail with reference to FIG. 22. In operation S241, the display controlling unit 159 determines whether or not the detected operation is the operation of returning to the start point. That is, the display controlling unit 159 determines whether the operating button of the user is the operation of the button B2 for returning to the start point or the operation of the button B7 for returning to the via point. If it is determined in operation S241 that the operation of returning to the start point is detected, the navigation unit 157 sets the start point as the destination.

If it is not determined in operation S241 that the operation of returning to the start point is detected, the display controlling unit 159 controls the display unit 12 to display a list of registered via points in operation S245. In operation S247, in response to the user's operation, the display controlling unit 159 determines whether or not any one of the registered via points is selected by the user, i.e., whether or not the destination is designated by the user. In operation S249, if it is determined in operation S247 that the user designates the destination, the designated point is set as the destination.

(2-3. Example of Effect)

In the foregoing, the PND 10b according to the second embodiment of the present disclosure has been described. The PND 10b has a function of registering a point classified as a specific genre among points near a position of the traveling user as a via point, in addition to the function of the PND 10a according to the first embodiment of the present disclosure. With such a configuration, the user may not collect only the start point but also information on facilities classified as the specific genre among points around a road between the start point and a current point that the user travels on. For example, the PND 10b may display an icon indicating the position of the registered via point which is overlapped on a map displayed on the screen for displaying the return route. Accordingly, the user may easily recognize the position of the registered via point. In addition, the PND 10b may provide the user with a button for easily searching for a route to return to the registered via point. If the user operates the button, the PND 10b may search for a route to return to the designated via point.

3. Third Embodiment (3-1. Function and Structure)

Figure 23:
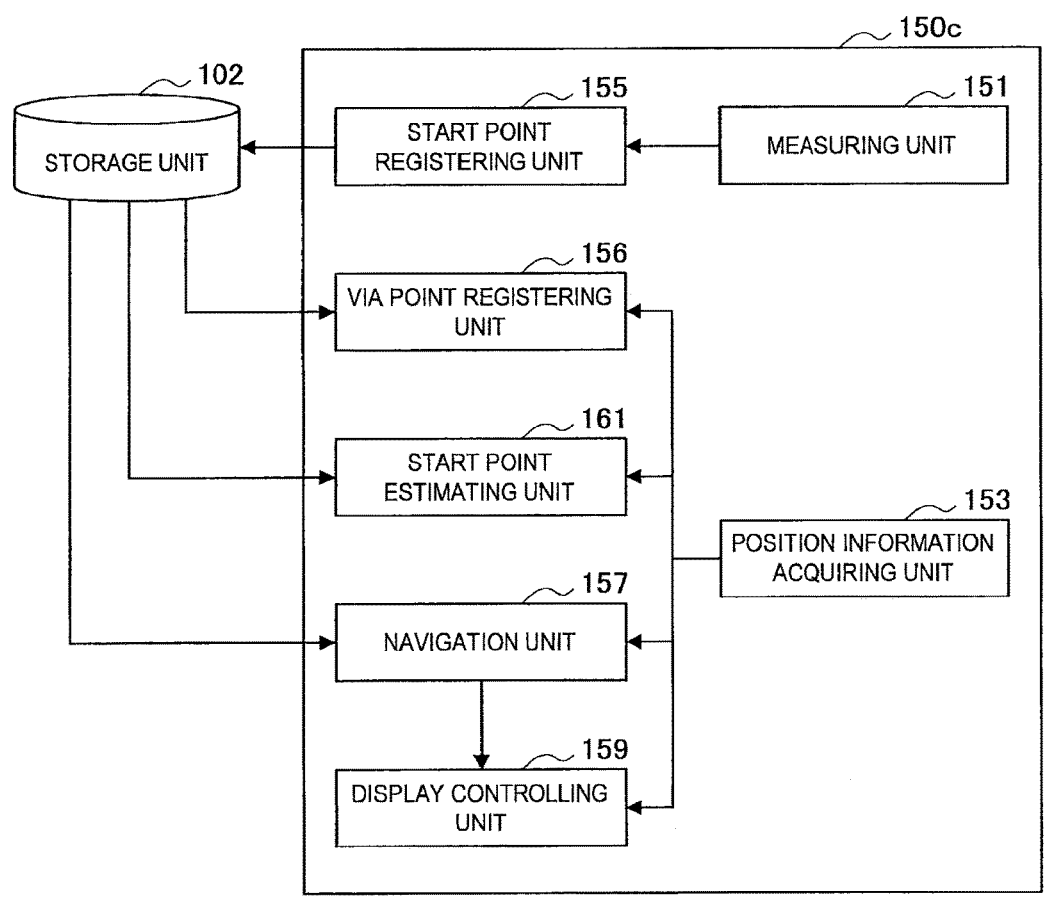
FIG. 23 is a block diagram illustrating the function and structure of a control unit of a PND according to the third embodiment of the present disclosure.

Next, the function and structure of the PND 10c according to the third embodiment of the present disclosure will be described with reference to FIG. 23. FIG. 23 is a block diagram illustrating the function and structure of a control unit of a PND according to the third embodiment of the present disclosure. The external appearance and general structure of the PND 10c are the same as those of the PND 10a according to the first embodiment of the present disclosure and those of the PND 10b according to the second embodiment of the present disclosure. The first embodiment of the present disclosure has been described above with reference to FIGS. 1 to 5 and a detailed description thereof will thus be omitted herein. The structure of the control unit 150c which is different from that of the second embodiment will be mainly described in detail.

The control unit 150c includes the measuring unit 151, the position information acquiring unit 153, the start point registering unit 155, the via point registering unit 156, the navigation unit 157, the display controlling unit 159, and a start point estimating unit 161. The measuring unit 151, the position information acquiring unit 153, the start point registering unit 155, the via point registering unit 156, and the display controlling unit 159 are the same as those of the PND 10b according to the second embodiment of the present disclosure and a detailed description thereof will thus be omitted herein. Further, a detailed description of the same ones of the following elements as those of the PND 10b according to the second embodiment of the present disclosure will be omitted.

The start point estimating unit 161 has a function of estimating a start point at the time when an operation of returning to the start point is detected unless the start point is registered by the start point registering unit 155. For example, if it is detected that the user travels on the cycling road, the start point estimating unit 161 may acquire information on the cycling road from the map data and estimate a departure point of the cycling road as a start point. As described above, if the position information acquiring unit 153 generates movement record information, the start point estimating unit 161 may estimate a start point based on the movement record information. The start point estimating unit 161 may estimate a start point based on a measurement result of the measuring unit 151 in addition to the movement record information. For example, the start point estimating unit 161 may estimate the start point based on at least one of the traveling time, average traveling speed, and traveling distance.

The navigation unit 157 may have the following function in addition to the function described in the second embodiment of the present disclosure. The navigation unit 157 may search for a return route from a current point to the start point estimated by the start point estimating unit 161. If the operation of returning to the start point is detected, the navigation unit 157 may set the start point, which is estimated by the start point estimating unit 161, as a destination and search for a route from the current point to the destination. In this case, the navigation unit 157 may search for multiple routes. The navigation unit 157 may start guidance of the course of a route selected from among the searched multiple routes.

In the foregoing, an example of the function of the PND 10c according to the present embodiment has been described. Each of the elements maybe made up of typical components or circuits or made up of hardware specialized for functions of each of the elements. In addition, the functions of each of the elements may be implemented by reading and analyzing control programs describing the processing procedure of the functions implemented by an operation device, such as CPU (central processing unit), from a recording medium, such as ROM (read-only memory) or RAM (random access memory), that stores the control programs. Accordingly, it is possible to adequately reconfigure the structure according to the level of technique of implementing the present embodiment. For example, according to an embodiment, some of the functions of the PND 10c related to the above-mentioned example may be omitted or a new function may be added to the PND 10c.

In addition, a computer program to implement the above-mentioned functions of the PND 10c according to the present embodiment may be made and installed in a personal computer or the like. In addition, a computer-readable recording medium storing the computer program may be provided. Examples of the recording medium may include a magnetic disc, an optical disc, a magneto-optical disc, or flash memory. The computer program may be transmitted, for example, through a network instead of using the recording medium.

(3-2. Example of Operation)

Figure 24:
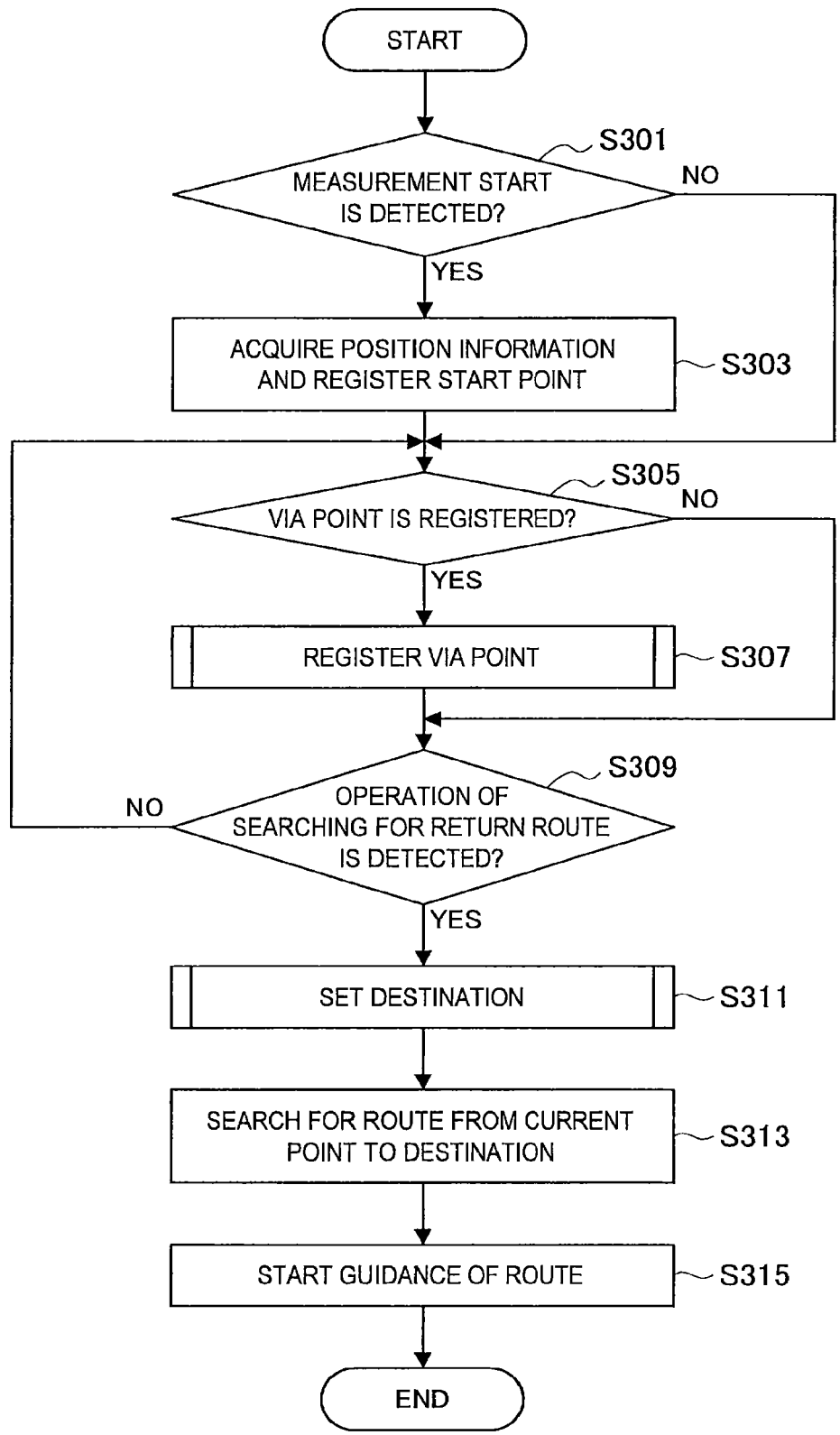
FIG. 24 is a flow chart illustrating an operation of a PND according to the third embodiment of the present disclosure.
Figure 25:
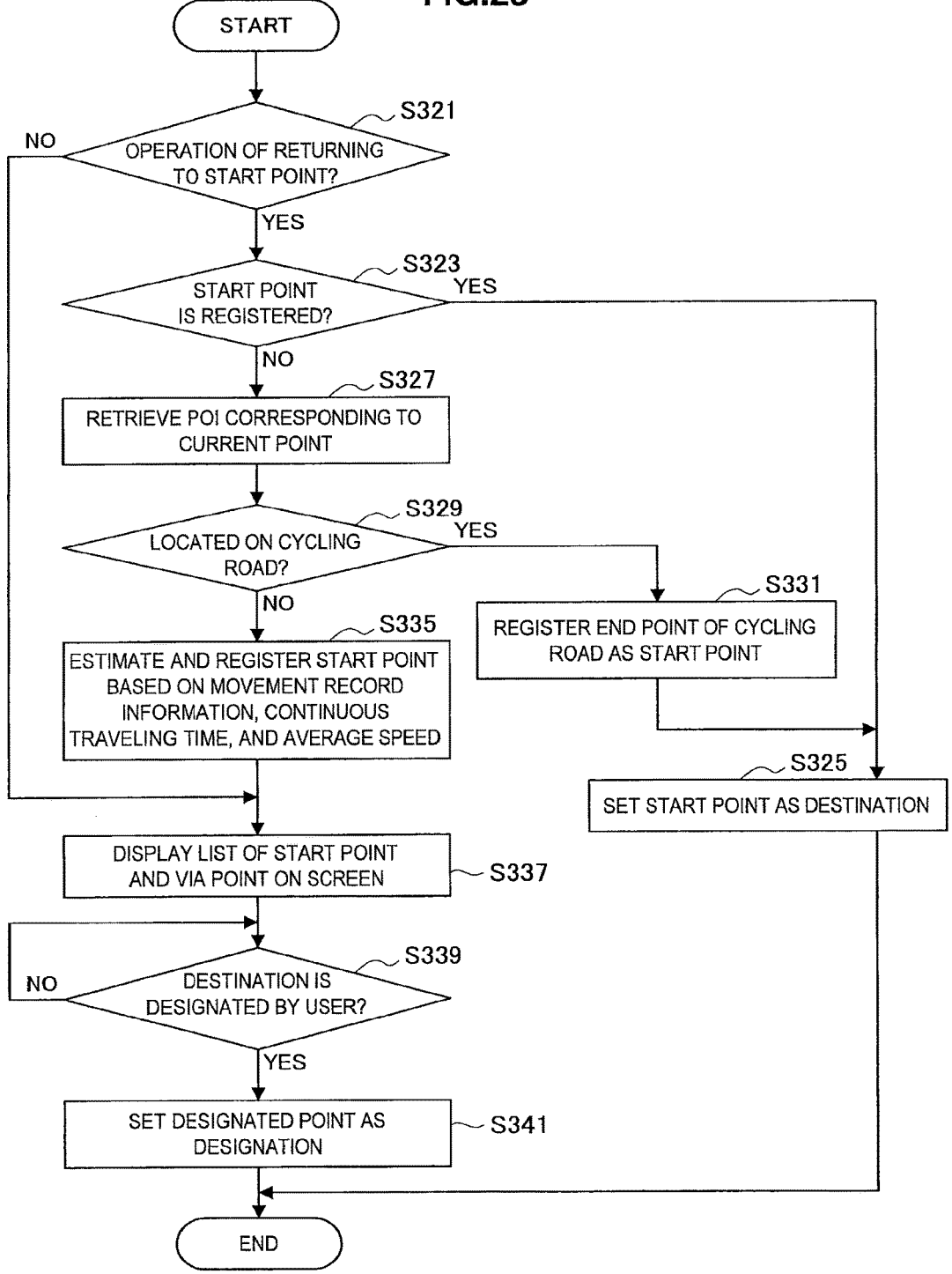
FIG. 25 is a flow chart illustrating an operation of setting a returning point of a PND according to the third embodiment of the present disclosure.

Next, an example of the operation of the PND 10c according to the third embodiment of the present disclosure will be described with reference to FIGS. 24 and 25. FIG. 24 is a flow chart illustrating an operation of a PND according to the third embodiment of the present disclosure. FIG. 25 is a flow chart illustrating an operation of setting a returning point of a PND according to the third embodiment of the present disclosure.

In the third embodiment, it is also assumed that the user installs the PND 10c in his/her cycle 50 and rides the cycle 50 on the cycling road as shown in FIG. 7. In addition, it is assumed that the user performs an operation of returning to a start point or a via point on the cycling road while riding the cycle on the cycling road. According to the present embodiment, even though the user forgets pushing the measurement start button, it is possible to estimate the start point and provide the user with a return route to return to the estimated start point.

The general operation of the PND will be described with reference to FIG. 24. In operation S301, it is determined whether or not the start point registering unit 155 detects that the measuring unit 151 starts the measurement. For example, the display controlling unit 159 controls the display unit 12 to display the display screen 1201 shown in FIG. 9 before starting the measurement. The display screen 1201 includes a measurement start button B1. The user may operate the measurement start button B1 for the measuring unit 151 to start the measurement. If the start point measuring unit 155 detects the measurement start of the measuring unit 155, the start point registering unit 155 registers position information of a current point at the time when the measurement start is detected as position information of the start point in operation S303. The position information is acquired by the position information acquiring unit 153. If the user has not operated the measurement start button B1, the operation S303 is omitted.

In operation S305, the via point registering unit 156 determines whether or not to register a via point. The via point registering unit 156 may refer to, for example, via point category information and perform the operation S305 based on whether or not a preset category is present. The via point registering unit 156 may perform the operation S305 based on whether or not an operation of registering the via point is preset. If it is determined in operation S305 that the via point is registered, the via point registering unit 156 performs the registration operation of the via point in operation S307 by extracting a POI indicating a point belonging to a preset genre and adding the POI to a list of registered points. The registration operation of the via point has been described with reference to FIG. 21 in the second embodiment and a detailed description thereof will thus be omitted herein.

After the user starts traveling, the display controlling unit 159 may control the display unit 12 to display a display screen 1217 (FIG. 20) including the button B2 for returning to the start point and the button B7 for returning to the via point. In operation S309, the display controlling unit 159 determines whether or not the operation of searching for a return route is detected based on whether or not either the operation of the button B2 for returning to the start point or the operation of the button B7 for returning to the via point is detected.

If it is determined in operation S309 that the operation of searching for the return route is detected, the navigation unit 157 performs an operation of setting a destination in operation S311. The operation of setting the destination will be described in detail with reference to FIG. 25. As a result of the operation of setting the destination in operation S311, the registered start point, the estimated start point, or the via point is set as the destination.

In operation S313, the navigation unit 157 searches for a route from the current point to the destination. In operation S315, the navigation unit 157 starts guidance of the course of the searched route.

The operation of setting the destination in operation S311 of FIG. 24 will be described in detail with reference to FIG. 25. In operation S321, the display controlling unit 159 determines whether or not the detected operation is the operation of returning to the start point. That is, the display controlling unit 159 determines whether the operating button of the user is the operation of the button B2 for returning to the start point or the operation of the button B7 for returning to the via point. If it is determined in operation S321 that the operation of returning to the start point is detected, the navigation unit 157 determines in operation S323 whether or not the start point is registered. If it is determined in the operation S323 that the start point is registered, the navigation unit 157 sets the registered start point as the destination and ends the operation of setting the destination.

If it is determined in the operation S323 that the start point is not registered, the navigation unit 157 retrieves a POI corresponding to the current point from the POI information based on the position information of the current point acquired by the position information acquiring unit 153 in operation S327. In operation S327, the navigation unit 157 determines whether or not the current point is positioned on the cycling road. If it is determined in the operation S329 that the current point is positioned on the cycling road, the navigation unit 157 registers an end point, i.e., a departure point of the cycling road as the start point in operation S331. The navigation unit 157 sets the registered start point, i.e., the departure point of the cycling road, as the destination in operation S325.

If it is determined in the operation S329 that the current point is not positioned on the cycling road, the start point estimating unit 161 estimates the start point in operation S335. The start point estimating unit 161 may estimate the start point based on, for example, information on the movement record, the continuous traveling time and the average speed.

After the start point is estimated in the operation S335 or it is determined in the operation S321 that the user's operation is not the operation of returning to the start point, the display controlling unit 159 may control the display unit 12 to display a list of the start point and via points in operation S337. In operation S339, the display controlling unit 159 receives the user's operation on the display screen displaying the list of the start point and via points and determines whether or not the user designates the destination. If it is determined that the user designates the destination, the navigation unit 157 sets the designated point as the destination in operation S341.

(3-3. Example of Effect)

In the foregoing, the PND 10c according to the third embodiment of the present disclosure has been described. The PND 10c has a function of estimating the start point in addition to the function of the PND 10b according to the second embodiment of the present disclosure. Accordingly, even though the user forgets the measurement start operation, the user may recognize the start point. If it is detected that the user is traveling on the cycling road, the PND 10c may set the departure point of the cycling road as the start point. If the user is traveling on the cycling road, the user is very likely to start traveling from the departure point of the cycling road. Accordingly, if the user is traveling on the cycling road, the PND 10c may set the departure point of the cycling road as the start point without obtaining the movement record information nor performing a complicated calculation of the average speed or the traveling time.

4. Fourth Embodiment

Figure 26:
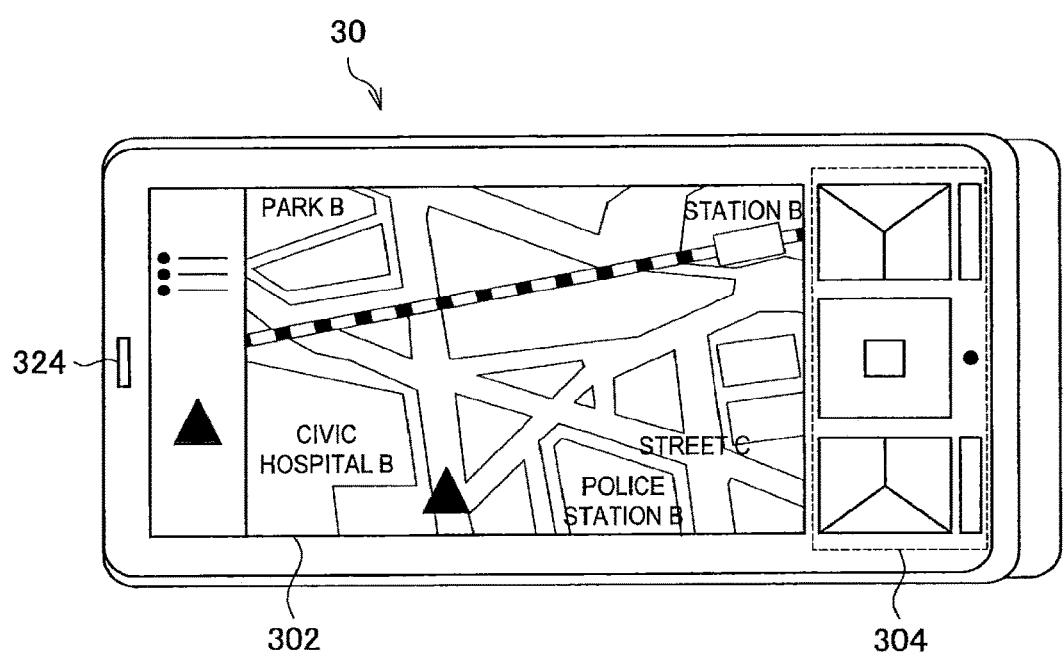
FIG. 26 is a view illustrating an external appearance of a mobile phone according to a fourth embodiment of the present disclosure.

As an example of the navigation device according to the fourth embodiment of the present disclosure, a mobile phone will be described with reference to FIGS. 26 and 27. FIG. 26 is a view illustrating an external appearance of a mobile phone according to the fourth embodiment of the present disclosure. FIG. 27 is a block diagram of the function and structure of a mobile phone according to the fourth embodiment of the present disclosure.

The mobile phone 30 shown in FIG. 26 is an example of the route search apparatus. The mobile phone 30 includes a display unit 302, an operating unit 304 and a speaker 324. Like the PND 10, the mobile phone 30 may be mounted on the cycle 50 by means of the cradle. Alternatively, the mobile phone 30 may be mounted on the cycle 50 by means of another accessory adapted to fix the mobile phone 30 to the cycle 50.

As shown in FIG. 27, the mobile phone 30 includes a navigation function unit 110, a display unit 203, an operating unit 304, a storage unit 308, a mobile phone function unit 310, and a control unit 334.

The mobile phone function unit 310 is connected to the display unit 302, the operating unit 304, and the storage unit 308. Although not shown in FIG. 27, the display unit 302, the operating unit 304 and the storage unit 308 are also connected to the navigation function unit 110. The structure of the navigation function unit 110 has been described above with reference to FIGS. 3, 6, 13 and 23 and a detailed description thereof will thus be omitted herein. The mobile phone 30 may include the navigation function unit 110 having the function of any one of the control unit 150a in FIG. 6, the control unit 150b in FIG. 13 and the control unit 150c in FIG. 23.

The mobile phone function unit 310 is configured to implement a communication function or an electronic mail function. The mobile phone function unit 310 includes a communication antenna 312, a microphone 314, an encoder 316, a transceiver 320, a speaker 324, a decoder 326, and a mobile phone controller 330.

The microphone 314 is configured to collect voice and output the voice as a voice signal. The encoder 316 may be configured to convert the voice signal input from the microphone 314 into a digital signal, encode the digital signal and output the voice data to the transceiver 320 under the control of the mobile phone controller 330.

The transceiver 320 is configured to modulate the voice data input from the encoder 316 by a predetermined modulation technique and wirelessly transmit the modulated voice data through the communication antenna 312 to a base station of the mobile phone 30. The transceiver 320 may demodulate a wireless signal and acquire voice data through the communication antenna 312 and output the voice data to the decoder 326.

The decoder 326 may be configured to decode the voice data input from the transceiver 320, convert the decoded voice data into an analog signal, and output the analog signal to the speaker 324 under the control of the mobile phone controller 330. The speaker 324 may output voice based on the voice signal supplied from the decoder 326.

When an electronic mail is received, the mobile phone controller 330 controls the transceiver 320 to supply the received data to the decoder 326 and controls the decoder 326 to decode the received data. The mobile phone controller 330 may control the decoder 326 to output the decoded electronic mail data to the display unit 302. The mobile phone controller 330 may control the display unit 304 to display the electronic mail data and control the storage unit 308 to record the electronic mail data at the same time.

When an electronic mail is transmitted, the mobile phone controller 330 may control the encoder 316 to encode the electronic mail data input through the operating unit 304 and control the transceiver 320 and the communication antenna 312 to wirelessly transmit the electronic mail.

The control unit 334 is configured to control the mobile phone function unit 310 and the navigation function unit 110. For example, if a phone call is received while the navigation function unit 110 performs a navigation function, the control unit 334 may temporarily switch the mobile phone 30 from the navigation function to the communication function of the mobile phone function unit 310. After the communication is over, the control unit 334 may control the navigation function unit 110 to restart the navigation function.

In the foregoing, as an example of the navigation device according to the present embodiment of the present disclosure, an example of the function of the mobile phone 30 has been described. Each of the elements maybe made up of typical components or circuits or made up of hardware specialized for functions of each of the elements. In addition, the functions of each of the elements may be implemented by reading and analyzing control programs describing the processing procedure of the functions implemented by an operation device, such as CPU (central processing unit), from a recording medium, such as ROM (read-only memory) or RAM (random access memory), that stores the control programs. Accordingly, it is possible to adequately reconfigure the structure according to the level of technique of implementing the present embodiment. For example, according to an embodiment, some of the functions of the mobile phone 30 related to the above-mentioned example may be omitted or a new function may be added to the mobile phone 30.

In addition, a computer program to implement the above-mentioned functions of the PND 10c according to the present embodiment may be made and installed in a personal computer or the like. In addition, a computer-readable recording medium storing the computer program may be provided. Examples of the recording medium may include a magnetic disc, an optical disc, a magneto-optical disc, or flash memory. The computer program may be transmitted, for example, through a network instead of using the recording medium.

Although preferred embodiments of the present disclosure are described in detail with reference to the appended drawings, the present technology is not limited thereto. It should be understood by those skilled in the art that various modifications, combinations, sub-combinations and alterations may occur depending on design requirements and other factors insofar as they are within the scope of the appended claims or the equivalents thereof.

For example, although the PND has been described as an example of the route search apparatus in the first to third embodiments of the present disclosure and the mobile phone has been described as an example of the route search apparatus in the fourth embodiment of the present disclosure, the present technology is not limited thereto. For example, the present technology may be applied to information processing apparatuses, such as portable game machine, portable music players, and portable image processing devices.

Although the navigation device having the function of acquiring a relative position by means of sensors and the function of acquiring an absolute position by means of the GPS has been described in the embodiments of the present disclosure, the present technology is not limited thereto. For example, the navigation device may include a position information acquiring unit including a receiver configured to receive WiFi radio waves from a plurality of base stations and a current position calculating unit configured to calculate a current position based on a triangulation method using distances between the navigation device and each of the base stations and positions of each of the base stations, where the distances are estimated from reception strengths of the WiFi radio waves. In addition, although the GPS has been described as an example of satellite navigation system, the satellite navigation system is not limited to the GPS. Examples of the satellite navigation system may include Galileo positioning system, GLONASS (GLObal NAvigation Satellite System), Compass navigation system, and QZSS Satellite System "MICHIBIKI". In this case, a single satellite navigation system may be used or a combination of positioning signals of a plurality of satellite navigation systems may be used. Accordingly, it is possible to adequately reconfigure the structure used to acquire position information according to the level of technique of implementing the present embodiment.

In addition, although the orbit data of the GPS satellite is included in the GPS signal in the embodiments of the present disclosure, the present technology is not limited thereto. For example, the orbit data of the GPS satellite may be acquired from an external server. Alternatively, the orbit data of the GPS satellite may be stored in the storage unit 102 beforehand.

Although the PND 10c according to the third embodiment of the present disclosure is configured to display an estimated start point and a list of via points on the display unit 12 if the start point is estimated, and to allow the user to designate a destination on the display unit 12, the present technology is not limited thereto. If the start point is not registered but is estimated, the PND 10c may search for a route to the estimated start point as a destination without receiving the user's designation. It should be understood by those skilled in the art that various modifications, combinations, sub-combinations and alterations may occur depending on design requirements and other factors insofar as they are within the scope of the present technology.

It should be noted that in the present disclosure, the operations described in the flow chart may be performed not only in time series in the described order but in parallel or individually. Further, it should be understood that the operations performed in time series may be performed in a different order from the described order.

Additionally, the present technology may also be configured as below.

(1) A route search apparatus including:

a measuring unit configured to measure a traveling distance or a traveling time;

a position information acquiring unit configured to acquire position information of a current point;

a start point registering unit configured to register the position information, which is acquired by the position information acquiring unit when the measuring unit starts the measurement, as position information of a start point; and a route searching unit configured to, if an operation of returning to the start point is detected, search a return route between the current point designated as a departure point when the operation of returning to the start point is detected and the start point designated as a destination.

(2) The route search apparatus according to (1), further including a display controlling unit configured to display a display screen including a first operating button for performing a function of searching for the return route when the measuring unit starts the measurement, wherein the route searching unit searches for the return route if operation of the first operating button is detected.

(3) The route search apparatus according to (1) or (2), wherein the route searching unit is configured to estimate traveling time of the return route based on the traveling time measured by the measuring unit with respect to a traveled route from the start point to the current point designated when the operation is detected.

(4) The route search apparatus according to (3), further including a display controlling unit configured to display a display screen including a destination arrival time of the return route based on the traveling time estimated for the return route.

(5) The route search apparatus according to (3) or (4), wherein the route searching unit is configured to analyze attributes of the traveled route based on the measurement result of the measuring unit and search for the return route taking the attributes into account.

(6) The route search apparatus according to any one of (1) to (5), further including a via point registering unit configured to register a point belonging to a predetermined category, which is located near a current point, as a via point.

(7) The route search apparatus according to (6), wherein the route searching unit searches for a route between the current point designated as a departure point when an operation of returning to the via point is detected and the via point designated as a destination.

(8) The route search apparatus according to (7), further including a display controlling unit configured to display a second operating button for performing a function of searching for a route to return to the via point if the via point registering unit registers the via point, wherein the route searching unit searches for the route to return to the via point if operation of the second operating button is detected.

(9) The route search apparatus according to any one of (1) to (8), wherein when the route search apparatus is operating in a cycling mode, the start point registering unit corrects the position information of the start point to be a departure point of a cycling road if the start point is close to the departure point of the cycling road.

(10) The route search apparatus according to (5), wherein the route searching unit searches for the return route having a shorter traveling time than that of the traveled route using traveling time of the traveled route.

(11) The route search apparatus according to (5), wherein the route searching unit searches for the return route having a longer traveling distance than that of the traveled route using a traveling distance of the traveled route.

(12) The route search apparatus according to (5), wherein the measuring unit calculates consumed calories of the traveled route, and the route searching unit searches for the return route having higher consumed calories than those of the traveled route using consumed calories of the traveled route.

(13) The route search apparatus according to (6), wherein the predetermined category includes a check point of a cycling road.

(14) The route search apparatus according to (6), wherein the via point registering unit registers a point, which is classified as a previously selected category, as the via point.

(15) The route search apparatus according to any one of (1) to (14), wherein the position information acquiring unit generates movement record information by recording a correspondence between the position information of the current point and information on date and time the position information is acquired, and the route search apparatus further includes a start point estimating unit configured to estimate a start point based on the movement record information if the start point is not registered by the start point registering unit when the operation of returning to the start point is detected.

(16) The route search apparatus according to any one of (1) to (14), further including a start point estimating unit configured to, if it is detected that the position information of the current point is a cycling road, estimate a departure point of the cycling road as the start point if the start point is not registered by the start point registering unit when the operation of returning to the start point is detected.

(17) The route search apparatus according to any one of (1) to (16), further including a navigation unit configured to inform of a course according to a route searched by the route searching unit.

(18) A route search method including:

measuring a traveling distance or a traveling time;

acquiring position information of a current point repeatedly;

registering the position information, which is acquired when the measurement of the traveling distance or the traveling time is started, as position information of a start point; and searching a return route between the current point designated as a departure point when the operation of returning to the start point is detected and the start point designated as a destination.

(19) A program configured to implement a route search method including:

measuring a traveling distance or a traveling time;

acquiring position information of a current point repeatedly;

registering the position information, which is acquired when the measurement of the traveling distance or the traveling time is started, as position information of a start point; and searching a return route between the current point designated as a departure point when the operation of returning to the start point is detected and the start point designated as a destination.

The invention claimed is:

1. An information processing apparatus, comprising:
   transceiver circuitry configured to retrieve position information of the information processing apparatus at a first point; and
   processing circuitry configured to:
   register the position information at the first point as a start point, wherein the start point is registered after correction of the position information to a second point on a map;
   receive a first user input to return to the start point after travel to a third point that is different from the start point;
   receive, after the first user input, a second user input corresponding to a condition to search for a return route from the third point to the start point;
   search for the return route based on the condition in the second user input; and
   output the return route at least on a display screen based on the map.

2. The information processing apparatus according to claim 1,
   wherein the processing circuitry is further configured to display a first operating button on the display screen, and
   wherein the second user input is received based on an operation on the first operating button.

3. The information processing apparatus according to claim 1,
   wherein the processing circuitry is further configured to:
   measure a first traveling time with respect to a traveled route from the start point to the third point; and
   estimate a second traveling time of the return route based on the measured first traveling time
   and the first user input.

4. The information processing apparatus according to claim 3, wherein the processing circuitry is further configured to display, on the display screen, a destination arrival time of the return route based on the second traveling time estimated for the return route.

5. The information processing apparatus according to claim 3, wherein the processing circuitry is further configured to:
   analyze attributes of the traveled route based on the measurement of the processing circuitry, and
   search for the return route based on the attributes.

6. The information processing apparatus according to claim 5, wherein the processing circuitry is further configured to search for the return route, that has a shorter traveling time than that of the traveled route, based on the first traveling time of the traveled route.

7. The information processing apparatus according to claim 5, wherein the processing circuitry is further configured to search for the return route, that has a shorter traveling distance than that of the traveled route, based on a traveling distance of the traveled route.

8. The information processing apparatus according to claim 1,
   wherein the processing circuitry is further configured to register a fourth point as a via point, and
   wherein the fourth point is located near the first point.

9. The information processing apparatus according to claim 8,
   wherein the processing circuitry is further configured to search for a travel route between the third point and the via point based on a user operation to return to the via point,
   wherein the third point is designated as a departure point and the via point is designated as a destination.

10. The information processing apparatus according to claim 9,
    wherein the processing circuitry is further configured to display a first operating button to search for the travel route to return to the via point based on registration of the via point by the processing circuitry, and
    wherein the search for the travel route to return to the via point is based on the user operation on the first operating button.

11. The information processing apparatus according to claim 8, wherein the processing circuitry is further configured to register the fourth point, which is classified as a category, as the via point.

12. The information processing apparatus according to claim 9, wherein the processing circuitry is further configured to output the return route to return to the second point.

13. An information processing method, comprising:
    in an information processing apparatus:
    retrieving position information of the information processing apparatus at a first point;
    registering the position information at the first point as a start point, wherein the start point is registered after correction of the position information to a second point on a map;
    receiving a first user input to return to the start point after travel to a third point that is different from the start point;
    receiving, after the first user input, a second user input corresponding to a condition for searching a return route from the third point to the start point;
    searching for the return route based on the condition in the second user input; and
    outputting the return route at least on a display screen based on the map.

14. The information processing method according to claim 13, further comprising:
    measuring a first traveling time with respect to a traveled route from the start point to the third point; and
    estimating a second traveling time of the return route based on the measured traveling time
    and the first user input.

15. The information processing method according to claim 14, further comprising displaying, on the display screen, a destination arrival time of the return route based on the second traveling time estimated for the return route.

16. The information processing method according to claim 15, further comprising:
    analyzing attributes of the traveled route based on the measurement; and
    searching for the return route based on the attributes.

17. The information processing method according to claim 16, wherein the analyzing includes searching for the return route having a shorter traveling time than that of the traveled route using the first traveling time of the traveled route.

18. The information processing method according to claim 16, wherein the analyzing includes searching for the return route having a shorter traveling distance than that of the traveled route using a traveling distance of the traveled route.

19. The information processing method according to claim 13, further comprising displaying the return route.

20. A non-transitory computer-readable medium having stored thereon, computer-executable instructions that, when executed by an information processing apparatus, cause the information processing apparatus to execute operations, the operations comprising:

retrieving position information of the information processing apparatus at a first point;

registering the position information at the first point as a start point, wherein the start point is registered after correction of the position information to a second point on a map;

receiving a first user input to return to the start point after travel to a third point that is different from the start point;

receiving, after the first user input, a second user input corresponding to a condition for searching a return route from the third point to the start point;

searching for the return route based on the condition in the second user input; and outputting the return route at least on a display screen based on the map.

\* \* \* \* \*